United States Patent [19]
Braytenbah

[11] 3,928,975
[45] Dec. 30, 1975

[54] ELECTRICAL SYSTEM FOR ELECTROHYDRAULIC EMERGENCY TRIP SYSTEM

[75] Inventor: Andrew S. Braytenbah, Pennsauken, N.J.

[73] Assignee: Westinghouse Electric Corporation, Pittsburgh, Pa.

[22] Filed: June 6, 1974

[21] Appl. No.: 477,115

[52] U.S. Cl. ............... 60/660; 290/40 R; 60/679
[51] Int. Cl. ........................................ F01k 13/02
[58] Field of Search ...................... 60/660–667, 60/658; 290/40 R

[56] References Cited
UNITED STATES PATENTS

| | | | |
|---|---|---|---|
| 2,830,441 | 4/1958 | Eggenberger | 60/663 X |
| 3,010,691 | 11/1961 | Canfield | 251/26 X |
| 3,097,489 | 7/1963 | Eggenberger et al. | 60/660 X |
| 3,614,457 | 10/1971 | Eggenberger | 60/660 X |
| 3,623,324 | 11/1971 | Eggenberger | 60/660 X |
| 3,848,138 | 11/1974 | Park | 290/40 R |
| 3,849,666 | 11/1974 | Park | 290/40 R |

Primary Examiner—Martin P. Schwadron
Assistant Examiner—H. Burks, Sr.
Attorney, Agent, or Firm—H. W. Patterson

[57] ABSTRACT

An electrohydraulic emergency trip system for a turbine power plant to close rapidly the steam inlet valves to the turbine is disclosed. The hydraulic portion of the system for decreasing the trip fluid pressure to the steam inlet valves is governed by a first and second electrically operable trip valve means, both of which are operated to trip the turbine. Each of the trip valve means is controlled by an independent voltage source. A contingency detection means, which operates in response to a trip contingency, is energized by a third voltage source that is generated by one or both of the first and second voltage sources. The system provides for ground fault detection upon testing for a trip contingency.

10 Claims, 10 Drawing Figures

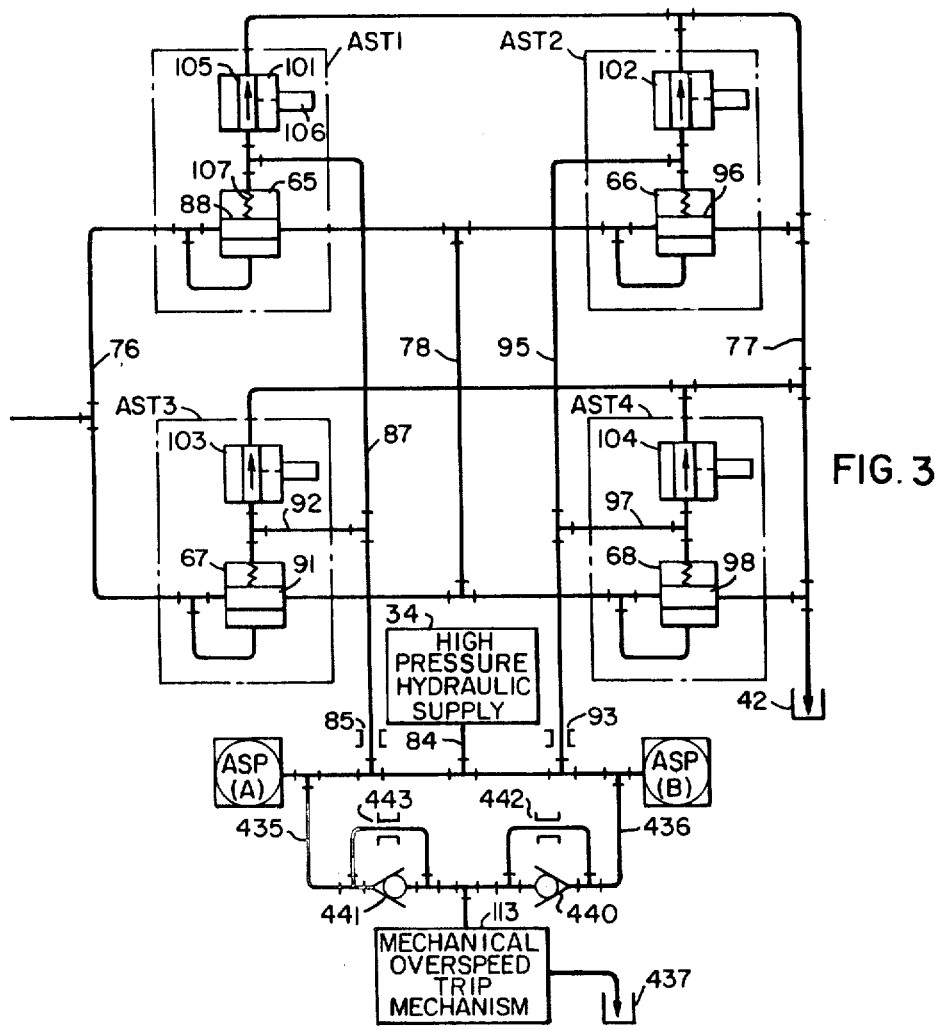
FIG. 3
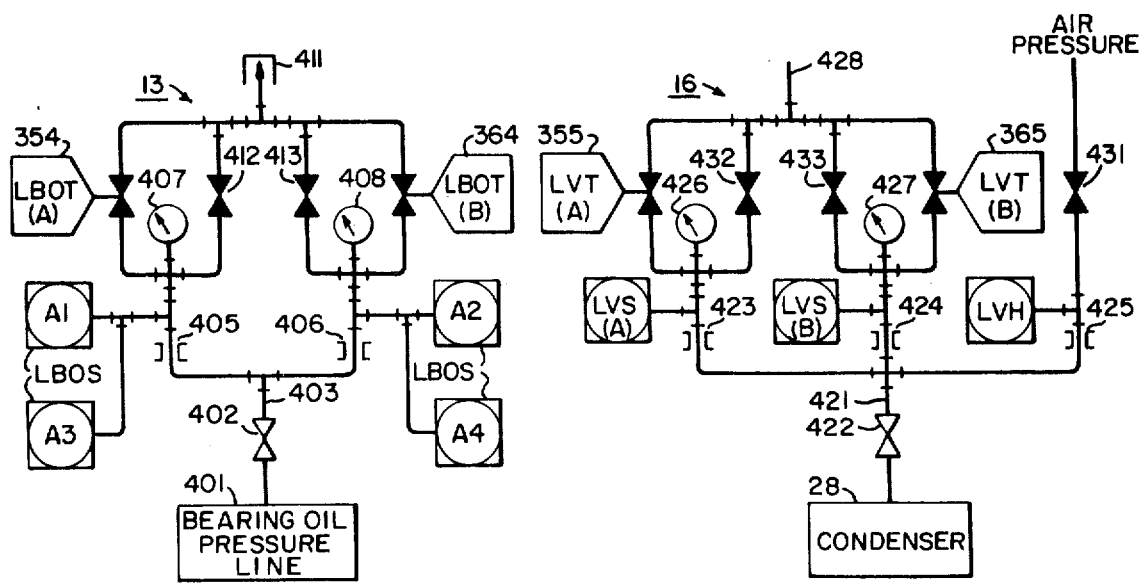
FIG. 9
FIG. 10

ELECTRICAL SYSTEM FOR ELECTROHYDRAULIC EMERGENCY TRIP SYSTEM

CROSS REFERENCE TO RELATED APPLICATIONS

Reference is made to the following concurrently filed and related patent applications which are assigned to the present assignee:

1. U.S. Ser. No. 477,114, filed June 6, 1974 entitled "Electrohydraulic On-Line Testable Trip System For Turbine Power Plant" and filed by Andrew S. Braytenbah and Karl O. Jaegtnes.

2. U.S. Ser. No. 477,116, filed June 6, 1974 entitled "Electrohydraulic Emergency Trip System For A Turbine Power Plant" and filed by Andrew S. Braytenbah, Karl O. Jaegtnes and Millard F. Smith.

3. U.S. Ser. No. 477,117, filed June 6, 1974 entitled "Improved Electrohydraulic Emergency Trip System and Method For Turbine Power Plant" and filed by Karl O. Jaegtnes and Millard F. Smith.

BACKGROUND OF THE INVENTION

During the operation of a turbine power plant, there are various conditions which may occur necessitating an immediate shutting down or "tripping" of the turbine. For example, a loss of electrical load may create a dangerous overspeed condition; low bearing oil pressure may cause excessive wearing and serious malfunction of the turbine bearings; excessive wearing of the thrust bearing results in axial misalignment of the rotating blades resulting in serious internal turbine damage; insufficient condenser vacuum may cause overheating at the last row of turbine blading; or other contingencies may occur where it is necessary to shut down or "trip" the turbine rapidly to prevent an unsafe operating condition or damage to the turbine power plant.

A failure or delay in shutting off the steam to the turbine in the event of any of the above contingencies may cause extensive damage to various portions of the plant, necessitating expensive repairs and prolonged shutdown. Thus, it is necessary that such a system react quickly to specific contingencies.

In a typical steam turbine power plant, oil is pumped at high pressure to a plurality of hydraulically operated valves for controlling steam flow. These valves are designed to open on an increase in oil pressure, and to close on a decrease in oil pressure. Governor valves control steam flow to the high pressure turbine and interceptor valves control the flow of steam to the intermediate and low pressure turbine stages. Throttle valves, which control the flow of steam to the steam chest upstream of the governor valves and reheat stop valves, which control the flow of steam from the reheater section of the steam generator to the intermediate and low pressure turbine stages upstream of the interceptor valves, are provided primarily for protective control of the turbine. The throttle valves are also used for turbine startup. Thus, when tripping the turbine, the throttle valves, the governor valves, the reheat stop valves, and the interceptor valves are rapidly closed. This is accomplished by releasing the oil pressure to all of the valves simultaneously in response to the detection of any one of several operational contingencies or by remote means under the control of the operator.

Turbine tripping systems presently in use utilize a mechanical hydraulic automatic stopping mechanism, which is referred to as an "autostop," to maintain under pressure, the valve control oil for the steam inlet valves. An emergency trip valve, as well as the throttle valves and the reheat stop valves, are under the control of a hydraulic system, referred to as an "autostop" control oil system. The maintenance of pressure in this "autostop" oil system permits the throttle and reheat stop valves to be opened and the pressure in the control oil system to be maintained by the emergency trip valve. An overspeed trip valve maintains the proper pressure in the "autostop" oil system to keep the emergency trip valve closed, and all steam inlet valves operable. The overspeed trip valve is operated to release the "autostop" oil pressure, either by a centrifugally operated overspeed tripping device on the turbine shaft, or the operation of the mechanical "autostop" trip lever by an operator. The centrifugally operated overspeed tripping device moves a lever when the turbine reaches a predetermined overspeed condition to cause the overspeed trip valve to release the "autostop" oil pressure, thus completely shutting down the turbine.

The conventional mechanical "autostop" assembly typically consists of a machined block, on which is mounted a lever arrangement which, when moved a predetermined distance, hydraulically causes the overspeed trip valve to release the "autostop" oil pressure. Connected to move the lever in the "autostop" assembly are a plurality of linkages which are connected to respective protective devices in the "autostop" machined block. For example, a low bearing oil pressure trip in the form of a spring-loaded diaphragm is exposed to bearing oil pressure, which releases high pressure oil to operate the overspeed trip valves when bearing oil pressure is below a predetermined valve. A low vacuum trip in the form of a pressure responsive bellows is exposed to exhaust vacuum, and operates the overspeed trip valve when the exhaust vacuum drops below a preset value. A thrust bearing trip in the form of a spring-loaded diaphragm operates the overspeed trip valve when pressure builds up in response to a certain position of the thrust collar. Finally, the "autostop" assembly includes a solenoid, which when energized by the operator, moves the lever on the "autostop" assembly to operate the overspeed trip valve.

Also, in conventional tripping systems, a separate overspeed trip mechanism, which consists of an eccentric weight mounted in the end of the turbine shaft, is balanced in position by a spring until the turbine speed exceeds a predetermined amount. The centrifugal force then overcomes the spring and the weight flies out, striking a trigger which trips the overspeed trip valve, releasing the "autostop" oil pressure and shutting down the turbine.

The conventional trip systems, presently in use, are effective in tripping the turbine, either manually by the operator, or in response to the various operating contingencies, including those previously mentioned. However, such systems are relatively slow in their operation because of the mechanical linkage. Also, it is desirable to be able to test the trip system and all of the components therein from such central office while the turbine is in operation and without tripping the turbine. This is of prime importance, particularly in nuclear installations where personnel cannot remain in certain areas beyond a short period of time. Further, in order to insure absolute safety of operation at all times, it is desirable that the turbine be capable of tripping in the event of the happening of any one of the protective contingencies, even during the testing of the components associated with the particular contingency causing the trip.

A failure of a single component in the conventional mechanical hydraulic system could prevent a valid trip. Also, the mechanical "autostop" portion of the system is difficult to adjust and its range of setting is limited. For example, with respect to a power plant installed at high altitudes, that portion of the system which would cause a trip on low vacuum had to be modified extensively in order to render it operative.

The conventional mechanical hydraulic system is also very cumbersome and difficult to test remotely. This is of prime importance in nuclear installations where personnel cannot remain in certain areas except during short periods of time.

Also, it is desirable that the electrical portion of the system be so structured that a loss of power will not cause or prevent an emergency trip, or that failure of any single sensing device does not prevent a trip, and that a failure of any one trip valve either in the open or closed position does not cause or prevent an emergency trip.

In turbine power plants where the controls are automated or controlled from a central office it is desirable to maintain the reliability and rapid response of a hydraulic system and to eliminate the relatively slow operation, difficulty of adjustment, and limited range of response, of the mechanical "autostop" assembly with its accompanying linkage.

SUMMARY OF THE INVENTION

The present invention broadly relates to an electrohydraulic emergency trip system to close the steam inlet valves to a turbine in response to a predetermined contingency in which the operating mechanism of the steam inlet valves operates to close the valves upon a decrease in trip fluid pressure. The opening of an hydraulic trip system operates to provide such a decrease in trip fluid pressure. The hydraulic system is opened upon the operation of both a first and second electrically operable trip valve means, each of which is electrically connected to an independent voltage source. A third voltage output is generated by the presence of a voltage from either one or both of the independent sources. A first and second contingency detection means are operated in a circuit means that is energized by the third output voltage; and the operation of the first and second contingency detection means governs the operation of the respective first and second trip valve means.

More specifically, the first and second voltage sources each generate an alternating voltage and the third voltage output is a DC voltage. The DC voltage is ungrounded, with a ground detection relay connected between the positive bus and ground, and a ground detection relay connected between the negative bus and ground to detect a ground fault on the respective positive and negative buses.

The contingency detection means are each connected in series with a resistance, across the positive and negative buses, and contingency sensing means are connected in the DC circuit between the relay winding and the resistance to the negative bus.

BRIEF DESCRIPTION OF THE DRAWINGS

FIG. 3 is a schematic diagram of an alternate arrangement of the hydraulic portion of the system utilizing a single high pressure fluid arrangement in conjunction with the mechanical overspeed trip of the power plant;

FIG. 9 is a schematic diagram of that portion of the system for testing and detecting a low bearing oil pressure operating contingency according to the present embodiment of the invention; and FIG. 10 is a schematic diagram of that portion of the system for detecting and testing low vacuum in the condenser according to the present embodiment of the invention.

DESCRIPTION OF THE PREFERRED EMBODIMENT

Figure 1:
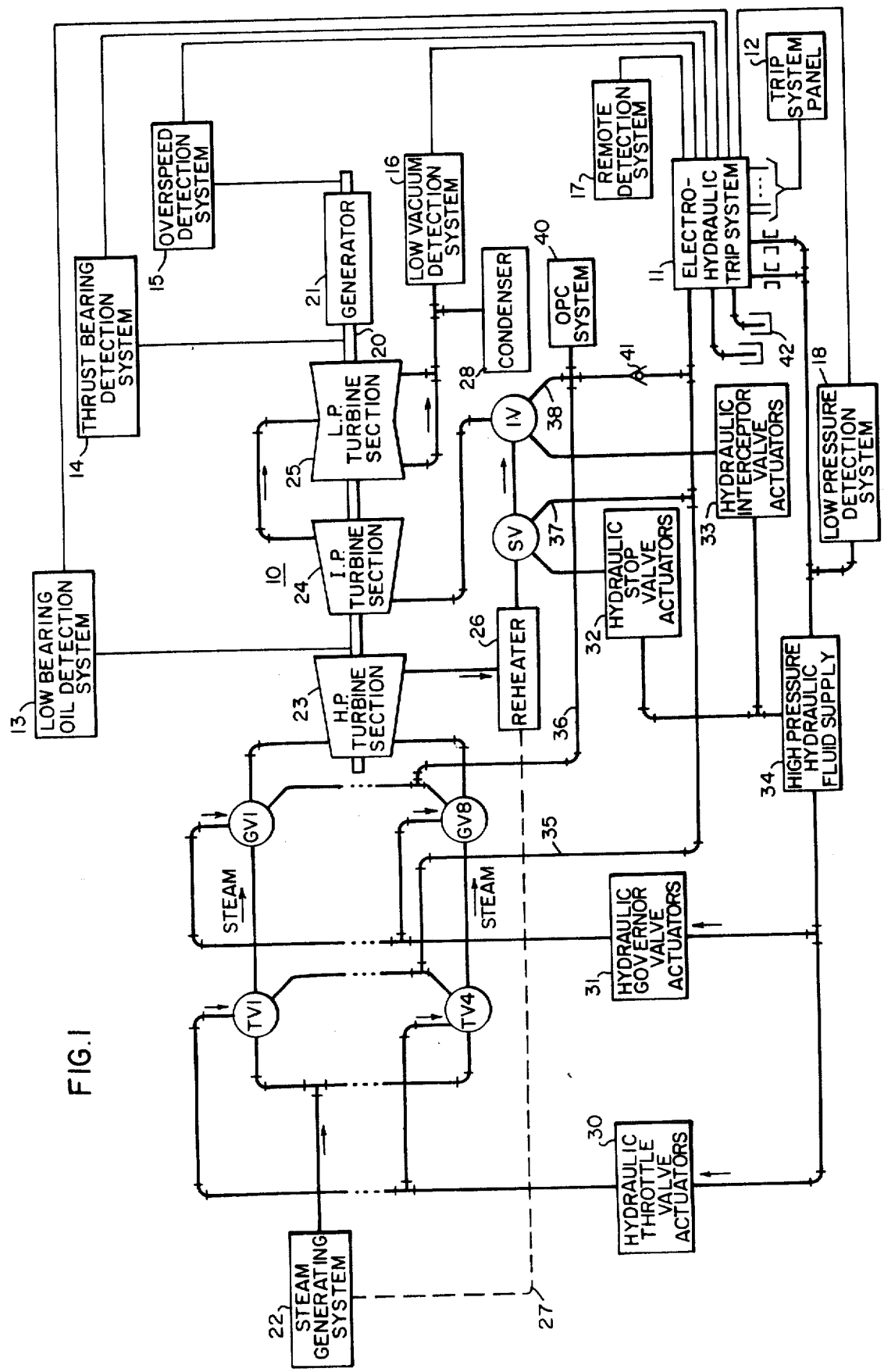
FIG. 1 is a schematic block diagram of a steam turbine power plant employing an emergency trip system in accordance with the principles of the present invention.

Referring to FIG. 1, a large single reheat steam turbine 10 is constructed in a well known manner and operated by controlling the throttle valves TV1–TV4, the governor valves GV1–GV8, reheat stop valves SV, and interceptor valves IV. An electrohydraulic trip system 11, which includes a remotely located control and indication trip system panel 12, operates to rapidly close the steam inlet valves TV, GV, SV and IV upon the occurrence of a malfunction or predetermined operating contingency detected by a low bearing oil detection system 13, a thrust bearing detection system 14, an overspeed detection system 15, or a low vacuum detection system 16, for example. Also, a remote detection system 17 may be operated to cause a closing of the steam inlet valves in response to a selected operating contingency which may be located and sensed remote from the turbine installation. A low pressure detection system 18 operates the electrohydraulic system 11 upon the lowering of the hydraulic pressure in the trip system by a predetermined amount. The steam turbine 10 and the steam inlet valves TV, GV, SV and IV are described herein as an environment within which the invention is particularly useful. However, the invention of the emergency trip system described herein may be utilized to respond to different operating contingencies than those herein described to close steam inlet valves of different types and numbers with other types of steam turbines.

The steam turbine 10 is provided with a single output shaft 20 which drives a conventional large alternating current generator 21 to produce the electric power. The steam is supplied from a suitable steam generating system 22.

In the present instance, the turbine 10 is of the multistage axial flow type and includes a high pressure section 23, an intermediate pressure section 24, and a low pressure section 25. In other applications, turbines operated in accordance with the present invention can have other forms with more or fewer sections tandemly connected to one shaft or compoundly coupled to more than one shaft. Also, in the present instance the turbine 10 is of the plural inlet front end type wherein steam flow is accordingly directed to the turbine steam chest (not specifically indicated) through four throttle inlet valves TV1-TV4. Generally, the plural inlet type and other front end turbine types, such as the single-ended type or the end bar lift type may involve different numbers and/or arrangements of throttle valving.

Steam is directed from the admission steam chest to the first high pressure section 23 through a governor steam inlet valves GV1-GV8 which supply steam to inlets arcuately spaced about the turbine high pressure casing, thereby forming a somewhat typical governor valving arrangement for large fossil fuel turbines. Nuclear turbines might, on the other hand, typically utilize only four governor valves.

After the steam has passed through the high pressure section 23, it is directed to a reheater system 26 which is associated with the steam generating system 22. In practice, the reheater steam system 26 might typically include a pair of parallel connected reheaters associated with the turbine casing and coupled to the steam generating system 22 in heat transfer relation as indicated by the dashed line 27. With a raised enthalpy level, the reheated system flows from the reheater system 26, through the intermediate pressure turbine section 24, and the low pressure turbine section 25, to a condenser 28, from which water flow is directed (not shown) back to the steam generating system 22.

To control the flow of reheat steam, stop valving SV, referred to as reheat stop valves, are normally opened or closed to protect against turbine overspeed, or upon the tripping of the emergency trip system 11 in response to any of the operating contingencies. Intercept valving IV, which may include a plurality of valves, is also provided in the reheat steam flow path, and in this instance such valving is normally open and operates over a range of positioning control to provide reheat steam flow under turbine overspeed conditions. The intercept valving IV is also closed in response to the operation of the electrohydraulic trip system 11.

Respective hydraulically operated throttle valve actuators indicated by the reference character 30 are provided for the four throttle valves TV1-TV4. Similarly, respective hydraulically operated governor valve actuators indicated by the reference character 31 are provided for the eight governor valves GV1-GV8. Hydraulically operated actuators 32 and 33 are also provided for the reheat stop valving SV and the intercept valving IV, respectively. A fluid supply, referred to at 34, provides the hydraulic pressure for actuator operation of the steam inlet valves TV1-TV4, GV1-GV8, SV, and IV. A lubricating oil system (not shown) is separately provided for turbine plant lubricating requirements such as the bearings, for example, and is monitored by the low bearing oil pressure detection system 13 connected to the electrohydraulic trip system 11. The high pressure from the hydraulic fluid supply 34 is monitored by the low pressure detection system 18 which is connected to the electrohydraulic trip system 11.

The respective actuators 30 and 31 are of conventional construction and are operated by position controls which include electronic circuitry with a conventional analog controller for driving a suitable known actuator servo valve. The reheat stop valve actuators 32 and intercept valve actuators 33 are controlled to be fully open unless the trip system operation or other operating means causes them to close and stop the reheat steam flow. Position control operation of the intercept valving IV is typically provided only under reheat steam flow cutback requirements.

The steam inlet valves TV1-TV4, GV1-GV8, SV, and IV are able to be controlled by their respective valve actuators to an open position only when their respective operating mechanism is subjected to a predetermined pressure from the high pressure hydraulic fluid supply system 34. As shown in the schematic diagram of FIG. 1, the throttle valves TV1-TV4 are hydraulically connected to the trip system 11 through piping 35; the governor valves GV1-GV8 are hydraulically connected through piping 36; reheat stop valving SV is hydraulically connected to the trip system 11 through piping 37; and the intercept valving IV is hydraulically connected through piping 38. A predetermined decrease in pressure in the lines 35, 36, 37 and 38 cause the steam inlet valves to rapidly close regardless of the control provided by their respective hydraulic valve actuators. In addition, there is an overspeed protection control system 40 which maintains the fluid supply pressure to permit the governor valves GV1-GV8, and the valving IV to be controlled to an open position separately from the emergency trip system 11. Upon operation of the system 40, only the governor valves GV1-GV8 and intercept valving IV are closed. A check valve 41 prevents the release of fluid pressure from the throttle valves TV1-TV4 and the reheat stop valving SV upon operation of the overspeed protection control system 40. The operation of the electrohydraulic trip system 11 releases such fluid pressure to a drain such as referred to at 42.

The turbine trip system panel 12 includes a selector switch (not shown in FIG. 1) for individually testing the various operating contingencies, such as low hydraulic fluid supply pressure, referred to at 18, low bearing oil pressure, referred to at 13, thrust bearing wear detection, referred to at 14, overspeed detection, referred to at 15, low vacuum detection, referred to at 16, and the remote contingency detection referred to at 17. The panel 12 also includes means for indicating the condition of the emergency trip system, as more fully described hereinafter.

Figure 2:
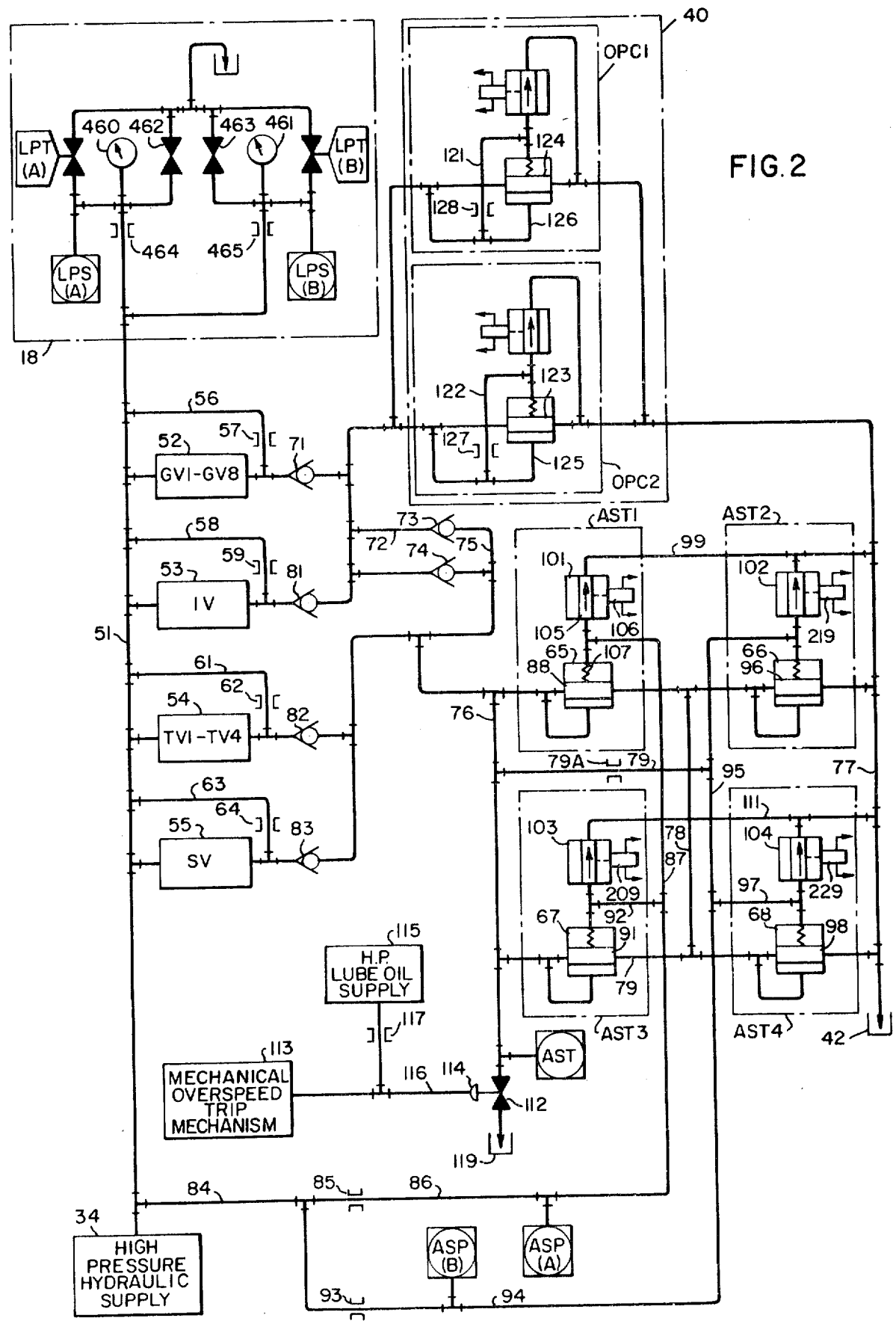
FIG. 2 is a schematic diagram of the hydraulic portion of the emergency trip system according to one embodiment of the invention and illustrating schematically as a portion thereof the system for detecting and testing the hydraulic pressure in the trip system.

Referring to FIG. 2, the electrohydraulic trip system 11 (FIG. 1) includes a hydraulic portion for maintaining a predetermined fluid presure in communication with the steam inlet valves' operating mechanisms under normal conditions so that the valves can be operated to an open condition; and to decrease such pressure below the trip pressure in response to an abnormal operating contingency for rapidly closing the steam inlet valves.

The hydraulic portion of the system of FIG. 2 includes the high pressure hydraulic supply system 34 which supplies oil under pressure at nominally 1800 pounds per square inch in the pipe line 51 to the operating mechanism of the steam inlet valves. In FIG. 2, the operating mechanism for each of the valves is shown schematically by block 52 for the governor valves GV1–GV8; by block 53 for the intercept valving IV; by block 54 for the throttle valves TV1–TV4; and by reference numeral 55 for the reheat stop valving SV. A more detailed description of the steam inlet valves' operating mechanism, insofar as it is applicable to a description of the present invention, will be described in connection with FIGS. 3 and 4. Although a single operating mechanism is shown schematically in block form for each type of steam inlet valve, in actual practice, typically, there would be an operating mechanism connection to the high pressure hydraulic supply for each individual valve. The hydraulic pressure required to render the governor valves operative to an open position is supplied from the line 51 through line 56, orifice 57 to the operating mechanism 52. The orifice 57 restricts the flow of oil to an extent whereby a release of pressure on the lower side of the orifice 57 as viewed in the drawing does not effectively decrease the pressure in the pipeline 51. Similarly, fluid under pressure is conducted through pipeline 51, line 58, and orifice 59 to the operating mechanism 53, representative of the intercept valves IV. Also, the throttle valve operating mechanism 54 is subjected to fluid pressure through pipeline 51, pipeline 61, and an orifice 62. Also, high pressure hydraulic fluid is conducted through line 51 and line 63 through orifice 64 to the operating mechanism 55 for the reheat stop valving SV. In all instances, the pressure of the fluid from source 34 is not effectively reduced in line 51 when pressure is released on the lower side of each of the restrictive orifices 57, 59, 62, and 64.

A plurality of pilot operated solenoid valves AST1, AST2, AST3, and AST4 are so connected in the hydraulic portion of the trip system and with respect to each other to either release the hydraulic pressure downstream of the restrictive orifices 57, 59, 62, and 64 to the drain 42 or to block the drain 42 to maintain the predetermined pressure required to operate the steam inlet valves in accordance with a respective open or closed operating condition. Each valve AST has a main portion and a pilot portion. The valve AST1 has a main portion 65. The valve AST2 has a main portion 66. The valve AST3 has a main portion 67; and the valve AST4 has a main portion 68. Each of the valves AST is shown with its main portion in a closed position to maintain the fluid pressure in communication with the operating mechanism of the steam inlet valves. Each valve AST has its main portion connected with respect to the main portion of each other valve AST so that the fluid pressure is released to drain to rapidly close the steam inlet valves when the pilot operated valve AST1 and the pilot operated valve AST2 or AST4 is opened. Also, the fluid pressure can be decreased to rapidly close the steam inlet valves when the valve AST1 is in a closed position provided that the valve AST3 and either AST2 or AST4 is in its opened position.

For example, when the valves AST1 and AST2 are opened, the hydraulic pressure is suddenly decreased to a value that rapidly closes all the steam inlet valves. For example, the pressure for the operating mechanism 52 for the governor valves GV is released through check valve 71, pipeline 72, either check valve 73 or 74, pipeline 75, pipeline 76, the main valve portion 65 of the valve AST1, main portion 66 of the valve AST2, and the pipeline portion 77 to the drain 42. When the valves AST4 and AST1 are opened, the fluid pressure is released from the main portion 65 through pipeline 78 and the main portion 68 of the valve AST4 to the drain 42. If both the valves AST2 and AST4 are closed, then the pressure is maintained to render the steam inlet valves responsive to be controlled to an open position by preventing the high pressure oil from reaching the drain 42. Similarly, with the valve AST3 open, the main portion 68 and the main portion 66 of closed valves AST2 and AST4 block the drain 42. Thus, the opening of the valves AST1 and AST3 with the valves AST2 and AST4 closed, does not release the oil pressure in the hydraulic system. Similarly, the opening of the valves AST2 and AST4 with the valves AST1 and AST3 closed does not release the fluid pressure to the drain 42. Thus, the valves AST1 and AST2 have their main portions connected in series; and the valves AST3 and AST4 have their main portions connected in series. The series connected pairs AST1 and AST4, and AST2 and AST3 are further connected in series with respect to each other by way of the pipeline 78. Thus, a malfunction of any one of the valves AST to an open position will not cause the turbine to trip; nor will the malfunctioning of any one of the valves AST to the closed position prevent the turbine from an emergency trip. Further, the opening and closing of the valves AST1 and AST3 has no effect on the steam inlet valves as long as both valves AST2 and AST4 are closed; and likewise, the opening of both valves AST2 and AST4 does not release the fluid pressure from the steam inlet valves when valves AST1 and AST3 are closed. Line 79 which includes restrictive orifice 79a connecting pipeline portion 76 to pipeline portion 78 equalizes the hydraulic pressure between the inlets to the pilot valves AST1 through AST4.

The pressure is released from the intercept valve operating mechanism 53 through check valve 81, either check valve 73 or 74, pipeline portion 75 and pipeline portion 76 in the manner previously described. Also, the pressure is released from the throttle valve operating mechanism 54 through check valve 82 and the pipelines 75 and 76; and the reheat stop valve mechanism 55 releases its pressure through check valve 83 and the pipeline portions 75 and 76, as previously described. The check valves 73 and 74 are inserted in the trip lines for the governor valve operating mechanism 52 and the intercept valve operating mechanism 53 so that the pressure can be released from such operating mechanisms by the overspeed protection system 40 without tripping the throttle valves and reheat stop valves under certain predetermined operating situations.

The main portions 65, 66, 67, and 68 of the valves AST1 through AST4, respectively, are held in their closed position by fluid pressure from the high pressure hydraulic supply system 34. The valves AST1 and AST3 are held closed by pressure from the fluid supply 34 by way of pilot pipeline portion 84, through restrictive orifice 85, pilot pipeline portion 86, and pilot pipeline portion 87. For valve AST1 the fluid pressure is introduced into the main portion 65 above piston 88 to hold the piston 88 in blocking relationship between pipeline portions 76 and 78. Similarly, the fluid pressure from the supply 34 communicates with the main portion 67 of the valve AST3 above piston portion 91 over line 92 to maintain the piston 91 in a position to block the flow of oil from the pipeline portion 76 to pipeline portion 79.

Similarly, the main portions 66 and 68 of the valves AST2 and AST4 are maintained in their closed position by fluid pressure from hydraulic supply 34 by way of the pipeline portion 84, through a restrictive orifice 93, pipeline portion 94, and pipeline portion 95. Piston 96 of valve AST2 is held in blocking relationship to the drain 42 by pressure in the line 95. Piston 98 of the valve AST4 is held in blocking relationship to the drain 42 by pressure in the line 97.

Each of the valves AST1 through AST4 has a pilot portion 101, 102, 103, and 104, respectively for controlling the pressure of the fluid against the piston member of the main portion of its respective valve. Each pilot portion includes a member which is movable to block or unblock the high pressure pilot fluid to the drain 42. The valve AST1 pilot portion 101 includes a member 105 which is movable to permit the passage of hydraulic pilot fluid from line 87, through lines 99 and 77 to the drain 42 upon the deenergization of its solenoid 106. In operation, when the solenoid 106 is deenergized, member 105 permits pipeline 87 to be in communication with the line 77 leading to the drain 42. This releases the pressure in lines 87 and 86 at the right-hand or downstream side of the restrictive orifice 85 as viewed in FIG. 2, which permits the piston member 88 of the main portion 65 to overcome its fluid pressure bias and move upwardly as viewed in FIG. 2 by the pressure of a spring member 107. The pressure in line 76 which communicates with the underside of member 88 through pipeline 108 also forces the piston member upwardly to open the main portion 65 rapidly. Also, the energizing of the solenoid 106 moves the member 105 to a blocking position thus permitting the pressure in the line 87 to build up above the member 88 causing the valve AST1 to close.

The restrictive orifices 85 and 93 are smaller than the passage through the pilot portions of the valves AST1 through AST4; and in one application are in the order of 30 mils. Generally, orifices should be as small as practicable within manufacturing tolerances, and large enough so dirt particles will not cause blocking.

The pilot portions 102, 103, 104 of the valves AST2, AST3, and AST4, respectively, operate in the same manner as described in connection with valve AST1. The pilot line portion 87 is connected in common with the pilot portions of the valves AST1 and AST3. Therefore, the opening of the pilot portion 101 of valve AST1 not only permits piston member 88 to open the hydraulic line but also permits piston member 91 of valve AST3 to open by decreasing the pressure in pipeline portion 92 which communicates with portion 101 of valve AST1. Also, the opening of the pilot portion 103 of valve AST3 releases the pilot pressure for the valve AST1 through the pilot portion 103 through line 87 and over pipeline portion 111 to the drain 42.

The main portions 66 and 68 of the valves AST2 and AST4 are connected in common to the pilot line portion 95 such that the opening of either pilot portion 102 of valve AST2 or pilot portion 104 of valve AST4 results in a decrease of pilot pressure to open the main portion 66 or 68 of the valves AST2 or AST4, respectively, in the same manner as described in connection with AST1 and AST3. Thus, should the pilot portion of either valve AST1 or AST3 fail to open to release the pilot pressure upon the deenergization of its respective solenoid, the main portions 65 and 67 of such valves will open through the release of pressure by the other valves pilot portion. Similarly, should either the pilot portion 102 of the valve AST2 or the pilot portion 104 of the valve AST4 fail to open upon the deenergization of its respective solenoid, the valve AST4, or the valve AST2 will open through the pilot portion of its commonly connected valve. The hydraulic trip pressure in line 76 can also be released by a diaphragm valve 112 in response to the operation of a conventional mechanical overspeed trip mechanism 113 which operates to release the pressure in diaphragm portion 114 of the valve 112 created by the high pressure lubricating oil supply system 115. In response to the operation of the overspeed trip mechanism 113, the pressure is released in pipeline portion 116 downstream of restrictive orifice 117, which causes the diaphragm valve 112 to open thereby releasing the pressure in the trip line 76 to the drain 119 to close rapidly the steam inlet valves GV, IV, TV, and SV. This is accomplished without the necessity of operating the solenoid valves AST1 through AST4.

Pressure switches ASP(A) and ASP(B) are connected to close a circuit to illuminate corresponding "tripped" lamps on the control panel 12 upon the release of pressure in lines 86 and 94 respectively, to indicate the opening of the valves AST1 through AST4. The pressure switch ASP(A) closes a contact upon the release of pilot pressure by the valves AST1 and AST3; and the pressure switch ASP(B) closes a contact to illuminate a "tripped" lamp upon the release of pilot pressure by the pilot valves AST2 and AST4. Thus, the operator is informed when the system has responded to a "test." The pressure switch AST is connected to operate a "trip" indication light upon the release of pressure in the line 76.

The overspeed protection system 40, which releases the hydraulic portion in response to an anticipated overspeed is comprised of normally closed deenergized pilot operated valves OPC1 and OPC2 which operate in a manner similar to the valves AST1 through AST4. Upon the energization of the pilot portion of the valves OPC1 or OPC2 the high pressure hydraulic supply is released from the governor valves GV and interceptor valves IV operating mechanisms 52 and 53 only without decreasing the hydraulic pressure to the operating mechanisms 54 and 55 of the throttle valves and reheat stop valves. The pressure in lines 121 and 122 is released upon energization of the valves OPC1 and OPC2, which permits piston members 123 and 124 to be driven upwardly by the pressure in the lines 125 and 126 that is maintained by restrictive orifices 127 and 128, respectively.

The low hydraulic supply pressure detection system denoted at 18 will be described in connection with the other predetermined operating contingency detection systems.

Referring to FIG. 3, a portion of the hydraulic portion of the emergency trip system shown in FIG. 2 is schematically illustrated to show the emergency trip system hydraulic arrangement in combination with the conventional mechanical overspeed tripping device 113 without the necessity of using the diaphragm valve 112 so that the mechanical overspeed trip mechanism 113 can be subjected directly to the high pressure hydraulic supply rather than utilizing a separate high pressure lub oil supply 114 as shown in FIG. 2.

In the alternative embodiment of FIG. 3, the mechanical overspeed trip mechanism 113 is connected to the pilot lines 87 and 95 by pipelines 435 and 436, respectively. The operation of the conventional mechanical overspeed trip mechanism 113, as is well known in the art, is connected to release the pressure in lines 435 and 436 in response to an overspeed of the turbine to connect the pilot line fluid to a drain 437. Thus with the release of the pilot line pressure in the lines 87 and 95, the main portions 65, 66, 67 and 68 of the solenoid operated pilot valves AST1 through AST4 open directly by releasing the pressure above the members 88, 91, 96 and 98. When testing the system as previously described, the reduction of the pilot line pressure in the line 87 or line 95 by the electrical operation of the pilot operated solenoid valves will not affect the mechanical overspeed trip mechanism because of check valves 440 and 441. Restrictive orifice 442 or 443 serve to operate the mechanical overspeed trip mechanism when the turbine is tripped by another contingency which then requires a mechanical latch as well as an electrical latch to again start the turbines.

Figure 4:
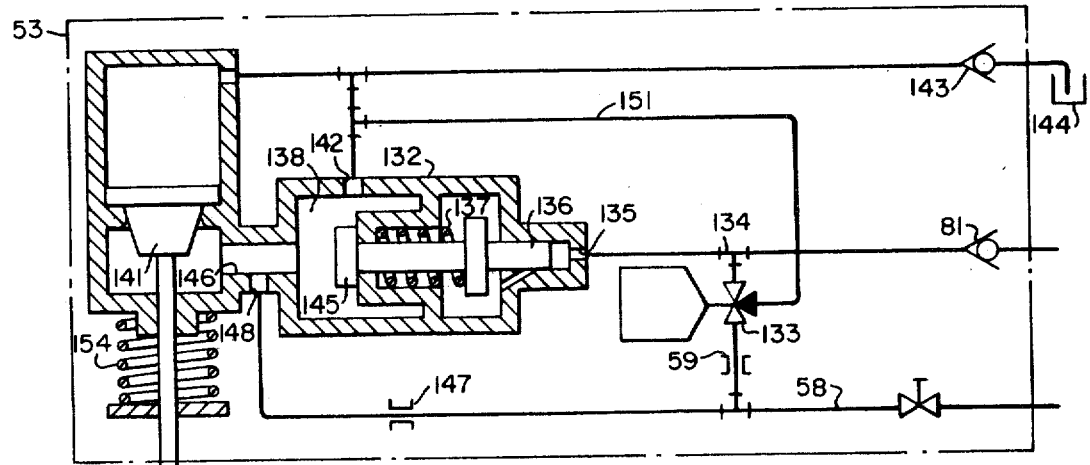
FIG. 4 is a schematic diagram of a typical hydraulic operating system for an interceptor and reheat stop valve controlled by the emergency trip system and method of the present invention.
Figure 4:
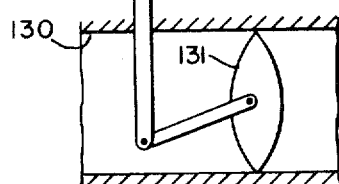

Referring to FIG. 4, a typical operating mechanism 53 is shown schematically for a conventional interceptor valve IV. In FIG. 4 the valve is shown in its closed position illustrated schematically by the blocking of a section of steam line 130 by a valve member 131. The high pressure hydraulic supply is in communication with the operating mechanism member 132 through the pipeline portion 58, the restrictive orifice 59, solenoid valve 133, pipeline portion 134, and through orifice 135 to bear against piston member 136 against the force of a spring 137. Upon release of the high pressure hydraulic fluid through the previously-described check valve 81, the member 136 moves to the extreme right as viewed in the drawing, permitting fluid in chamber 138 to flow from beneath valve piston 141 through orifice 142, and check valve 143 to a drain 144. When the valve is able to be operated to its open position, portion 145 of the member 136 blocks passage 146 which subjects the underside of the member 141 to hydraulic pressure from line 58 through orifice 147 and opening 148 into the chamber 146. The interceptor valves IV are either operated to an open or closed position by diverting the fluid from the high pressure line 58 to line 151 by the solenoid valve 133. This bypasses the high pressure fluid in the line 58 through the line 151 and the check valve 143 to the drain 144 permitting the member 141 to be spring biased by spring 154 to its closed position. The closing of the solenoid valve 133 has no effect on the emergency trip system pressure to the other valves because of the check valve 81.

Figure 5:
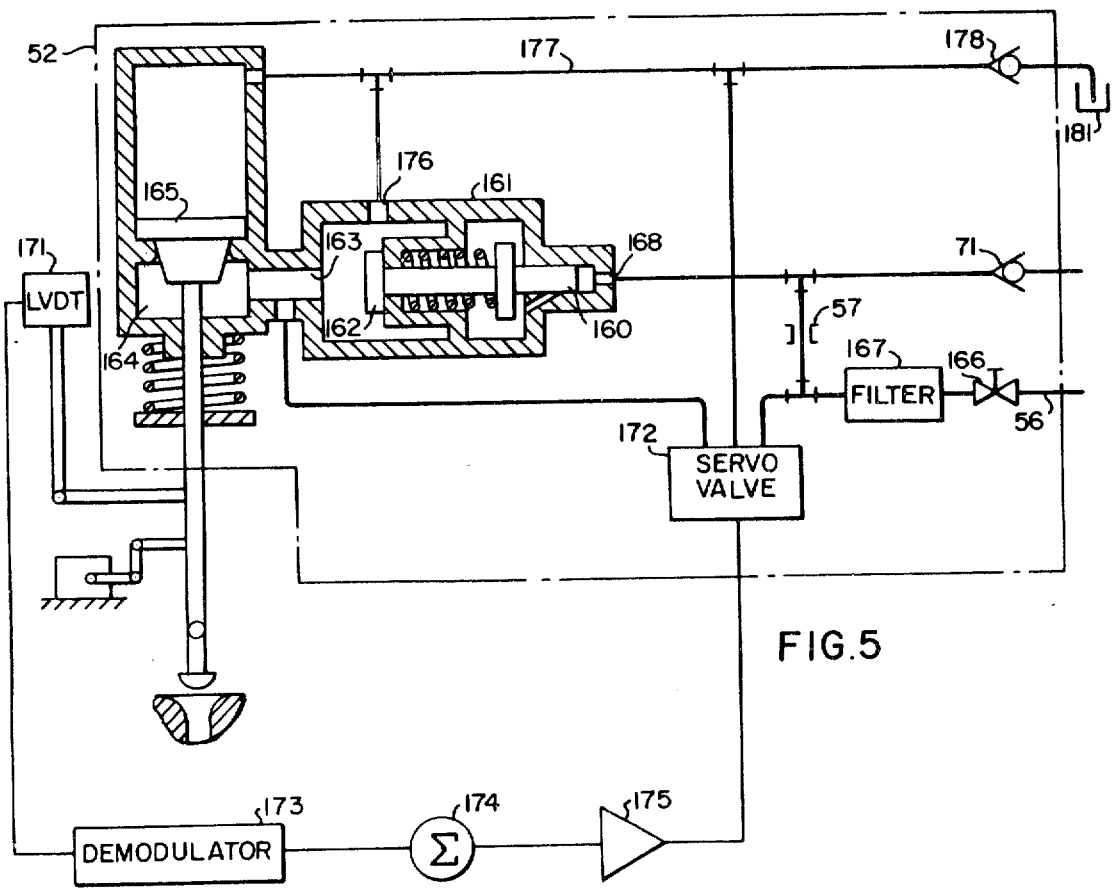
FIG. 5 is a schematic diagram of a typical hydraulic operating mechanism of a throttle and control valve controlled by the emergency trip system and method of the present invention.

Referring to FIG. 5, the conventional operating mechanism 52 is shown schematically for a typical governor valve which differs from the interceptor type valve IV of FIG. 4 in that it is controllable to any position intermediate to its open and closed positions as long as a predetermined hydraulic pressure is in communication with movable member 160 in member 161 of the operating mechanism 52 to maintain portion 162 against opening 163 leading to chamber 164 below the valve operating member 165. Such pressure is maintained from the hydraulic supply 34 (not shown) through the line 56 a valve 166 and a filter 167, the restrictive orifice 57 and opening 168 in the member 161. A valve position detection element 171, servo valve 172, demodulator 173, summing device 174 and amplifier 179 provide a conventional local electrohydraulic valve position control loop for each governor valve. This control loop, through the operation of the servo valve 172, regulates the pressure in the chamber 164 to position the member 165 in accordance with the desired opening of the valve. Of course, when the high pressure hydraulic supply is released through the check valve 71, the pressure is released in the chamber 164 through orifice 176, line 177 and check valve 178 to a drain 181 resulting in rapid closure of the valve.

The operating mechanism 54 for the throttle valves TV1-TV4 are similar to the operating mechanism 52; and the operating mechanism 55 for the reheat stop valves is similar to the operating mechanism 53 for the interceptor valve. The operating mechanism for the steam inlet valves are of conventional construction and form no part of the present invention but are described herein to illustrate the manner in which valves of such type rapidly close in response to a predetermined decrease in hydraulic pressure to which their operating mechanisms are subjected.

Figure 6:
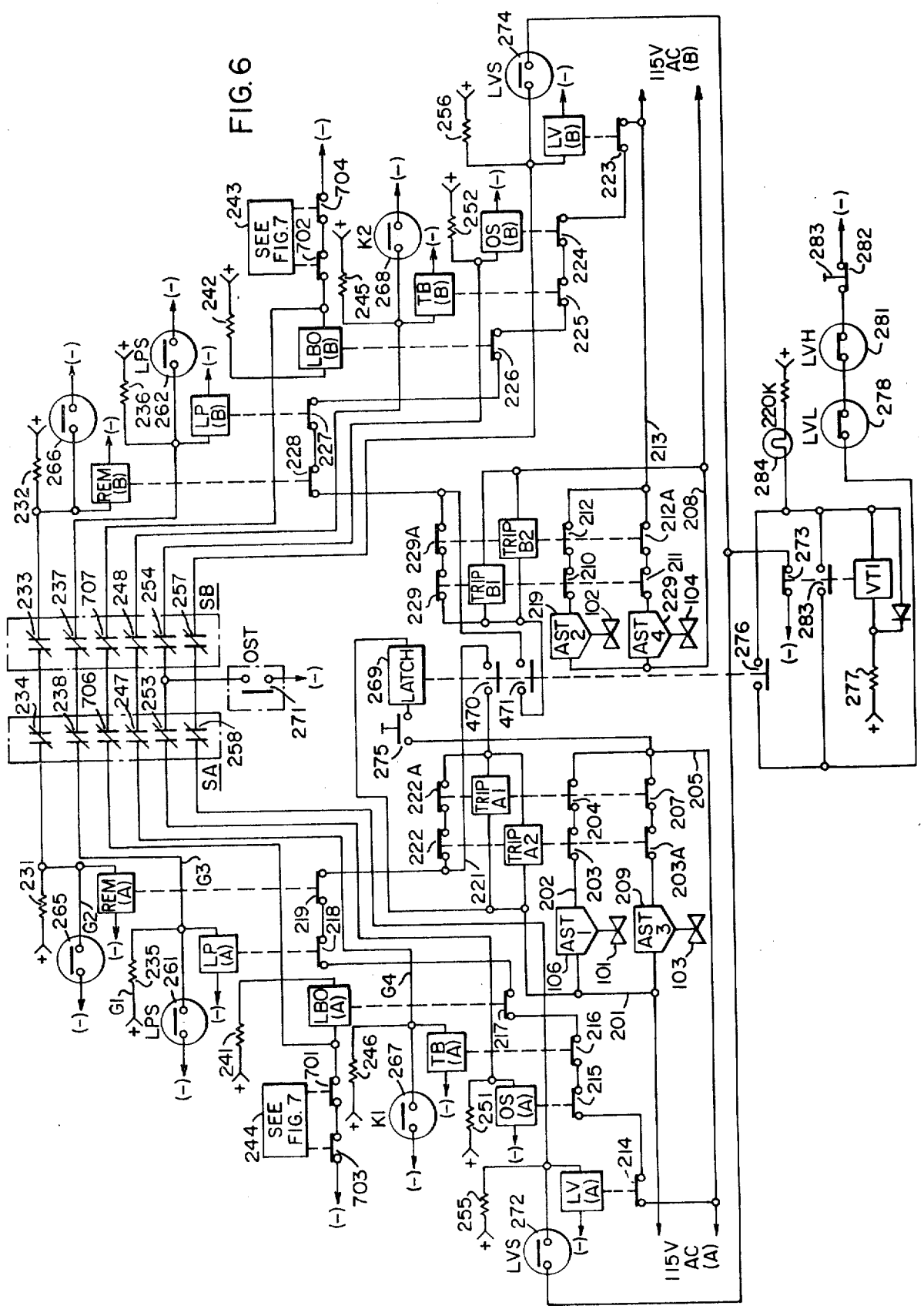
FIG. 6 is a schematic diagram of a portion of the electrical part of the emergency trip system in accordance with one embodiment of the present invention.

Referring to FIG. 6, the electrical portion of the electrohydraulic trip system 11 (FIG. 1) is illustrated schematically in a normal operating condition. Generally, the purpose of the electrical portion of the trip system is to operate the solenoid portion of the valves AST1, AST2, AST3 and AST4 to close the steam inlet valves in response to a predetermined operating contingency or malfunction; and to operate selected ones of the valves AST1 through AST4 for the purposes of testing the components of the electrohydraulic trip system without disturbing the operating position of the steam inlet valve; and at the same time rendering the emergency trip system responsive to a predetermined malfunction or operating contingency to rapidly close the steam inlet valves.

Solenoids 106 and 209 of the pilot portions 101 and 103 of the valves AST1 and AST3 respectively are maintained energized by a circuit which includes one terminal of an alternating current source (A) and includes lines 201 which is connected in parallel to one side of the winding of solenoid 106 of the pilot valves of AST1 and one side of the solenoid 209 of the pilot valve of AST3. The other side of the winding of the valve AST1 is connected by wire 202 through front contacts 203 and 204 of normally energized parallel connected trip relays A1 and A2, and wire 205 to the other terminal of the AC source (A). The other side of the winding of the solenoid 209 for valve AST3 is connected by wire 206, front contacts 207, 203A of the trip relays A1 and A2 and the wire 205 to the other side of the alternating current source (A).

Solenoids 219 and 229 of the pilot portions 102 and 104 of the valves AST2 and AST4, respectively are maintained normally energized in parallel by a circuit which extends from one terminal of an alternating current source (B) and includes wire 208, one side of the winding 219 and 229 of the solenoid for valves AST2 and AST4 in parallel, front contacts 210 and 211, and 212 and 212A of normally energized trip relays B1 and B2, wire 213 and the other terminal of the alternating current source (B). The trip relays A1 and A2, and B1 and B2, are connected in parallel with their contacts connected in series to better insure proper operation in the event of a sticking contact.

The trip relays A1 and A2 which hold the pilot portions of the solenoid valves AST1 and AST3 closed, are maintained energized by a circuit which extends from one terminal of the alternating current source (A) and includes front contact 214 of a normally energized low vacuum detection relay LV(A), front contact 215 of normally energized overspeed detection relay OS(A), front contact 216 of a normally energized thrust bearing wear detection relay TB(A), front contact 217 of normally energized low bearing oil pressure detection relay LBO(A), front contact 218 of low hydraulic pressure detection relay LP(A), front contact 219 of a remote operating contingency relay REM(A), wire 221, front contacts 222 and 222A of the trip relays A1 and A2 and the other terminal of the 115 volt AC current source (A).

The normally energized trip relays B1 and B2, which hold the pilot portions of solenoid valves AST2 and AST1 closed is maintained energized by a circuit which extends from one side of an alternating current source (B) and extends through front contact 223 of a low vacuum detection relay LV(B), front contact 224 of an overspeed detection relay OS(B), front contact 225 of a thrust bearing wear detection relay TB(B), front contact 226 of a low bearing oil pressure detection relay LBO(B), front contact 227 of a low hydraulic pressure detection relay LP(B), front contact 228 of a remote operating contingency relay REM(B), front contacts 229 and 229A of the trip relays B1 and B2, and the other side of the alternating current source (B).

Each pair of the normally energized similarly designated contingency detection relays (A) and (B) is provided for a distinct malfunction or operating contingency that is to trip the turbine. The windings of each pair of detection relays normally are connected in parallel to a DC power source through contacts of selector switches SA and SB when the system is not being tested for its associated operating contingency. In FIG. 6, the common DC positive bus is designated as (+) and the common DC negative bus is designated as (−).

Specifically, the normally energized relays REM(A) and REM(B) constitute a pair of detection relays associated with a predetermined remote operating contingency, such as an electrical load fault on the turbine-generator unit situation requiring a trip condition. The relay REM(A) is normally energized by a circuit which extends from (+) and includes resistor 231, which may be typically a 3,000 ohm resistor, and the winding of the relay REM(A) to (−). It is also energized by a circuit which extends from (+) and includes resistor 232, closed contact 233 of selector switch SB, closed contact 234 of selector switch SA, and the winding of the relay REM(A) to (−). The relay REM(B) is normally energized by a circuit which extends from (+) and includes the resistor 231, closed contact 234 of the switch SA and closed contact 233 of the switch SB, and the winding of the relay REM(B) to (−).

The detection relays LP(A) and LP(B) constitute a pair of relays for detecting a predetermined low pressure in the high pressure fluid supply system, which supplies fluid to all steam inlet valve actuators, as well as to the emergency trip system. The circuit for energizing the relay LP(A) extends from (+) and includes resistor 235; and the winding of relay LP(A) to (−) or extends from (+) and includes resistor 236, closed contact 237 of the switch SB, closed contact 238 of the switch SA, and the winding of the relay LP(A) to (−). The relay LP(B) is similarly energized normally by a circuit which can extend from (+) and includes the resistor 236, or extend from (+) and includes the resistor 235, the contacts 238 and 237 of the switches SA and SB, and the windings of the relay LP(B) to (−).

The relay TB(A) and the relay TB(B) constitute a pair of relays for detecting thrust bearing wear, for example, and are connected in a circuit in a manner similar to the previously-described detection relays to be energized directly from the positive DC bus through its respective resistor 245 or 246; or through closed contacts 247 and 248 of the switches SA and SB. Similarly, the relays OS(A) and OS(B) constitute a pair of relays for detecting an overspeed contingency for the steam turbine and are normally energized by a circuit which extends from (+) and includes either resistor 251 or 252 and its associated relay winding; or includes closed contacts 253 and 254 of the switches SA and SB. Finally, in accordance with the described embodiment of the invention, the detection relays LV(A) and LV(B) constitute a pair of relays for detecting insufficient vacuum in the condenser of the power plant. These relays are also connected to the common DC power source in the same manner as the previously-described detection relays. Specifically, the relay LV(A) is normally energized by a circuit which extends from (+) and includes resistor 255 and its winding to (−); or extends from (+) and includes resistor 256, closed contacts 257 and 258 of the switches SB and SA and its winding to (−). The relay LV(B) is energized by a circuit which extends from (+) and includes the resistor 256 and its winding to (−); or includes the resistor 255, the closed contact 258 of the switch SA, the closed contact 257 of the switch SB and the winding of the relay LV(B) to (−).

Figure 7:
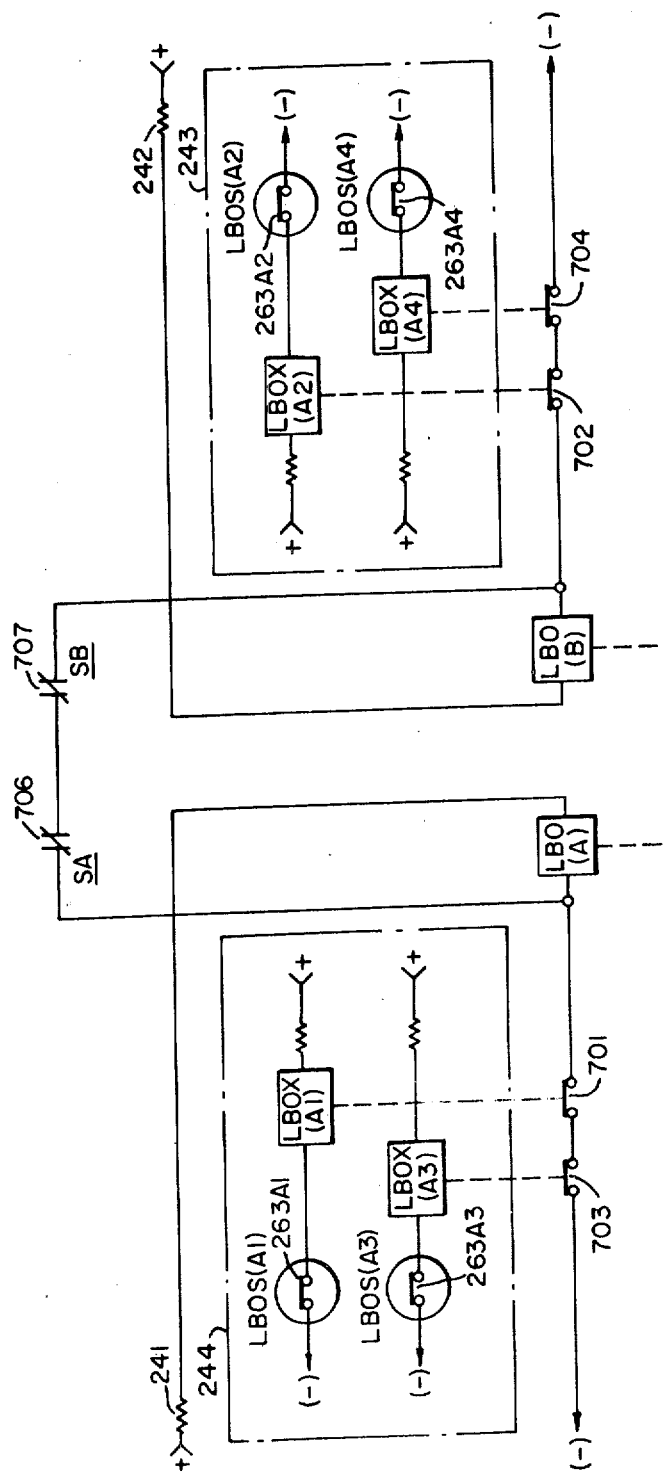
FIG. 7 is a schematic diagram of a modified version of the portion of the electrical system for sensing and detecting a trip contingency.

The relays LBO(A) and LBO(B), constitute a pair of relays for detecting the low bearing lubricating oil pressure of the turbine power plants and are normally energized during operation of the plant. Specifically, the relay LBO(A) is energized by a circuit which extends from (+) and includes either resistor 241, the winding of relay LBO(A), and the closed contacts 701 and 703 (to be described in connection with FIG. 7) to (−); or extends from (+) and includes the resistor 241, the winding of relay LBO(A), the closed contacts 706 and 707 of the switches SA and SB respectively, and closed contacts 704 and 702 (to be described in connection with FIG. 7) to (−). Similarly the relay LBO(B) is energized by a circuit which extends from (+) and includes resistor 242, the winding of relay LBO(B), and either includes the closed contacts 704 and 702, or the closed contacts 707 and 706 and the closed contacts 701 and 703 to (−). Although the sensing circuit to be described in connection with FIG. 7 is disclosed in connection with the low bearing oil pressure contingency. It is understood that such arrangement can be used for other contingencies, and the previously described arrangement can be used for the low bearing oil pressure contingency.

Each operating contingency or malfunction can be sensed by at least two condition responsive devices. In the present embodiment of the invention, the overspeed contingency can be sensed by either the mechanical overspeed trip mechanism 113 (See FIG. 2) or a switch OST (FIG. 6); and the remaining contingencies are sensed by two or more sensing devices as hereinafter described. Each of the sensing devices is a condition responsive switch, which in one described embodiment operates to close an electrical contact and in another embodiment operates to open an electrical contact when the particular contingency is in a state that requires an emergency turbine trip. These switches may be of any reliable well-known construction which are suitable for the purposes intended.

Referring specifically to the embodiment of FIG. 2, a sensing device LPS(A) is operative to close its contact 261 when the pressure in the high pressure fluid supply header decreases below a predetermined amount. Similarly, the pressure switch LPS(B) is operative to close its contact 262 when the pressure of the high pressure fluid supply header is decreased to such predetermined amount. Either the closing of the contact 261 of LPS(A) or the closing of the contact 262 of switch LPS(B) causes both the detection relays LP(A) and LP(B) to deenergize and open their front contacts 218 and 227 respectively. When the contact 261 closes, the relay LP(A) is shorted out by a circuit which extends from (+) and includes the resistor 235, and the closed contact 261 to (−). Also, the winding of relay LP(B) is shorted out by a circuit which extends from (+) and includes the resistor 236, closed contact 237 of the selector switch SB, closed contact 238 of the selector switch SA and the closed contact 261 of the switch LPS(A) to (−). Should the switch LPS(A) fail to operate properly for example, the closed contact 262 of the pressure switch LPS(B) shorts out both the LP(A) and LP(B) detection relays. This circuit extends from (+) and includes the resistor 236 and the closed contact 262 of the switch LPS(B) to (−). The relay LP(A) is shorted out by the circuit which extends from (+) and includes the resistor 235, the closed contacts 238 and 237 of the switches SA and SB, and the closed contact 262 of the switch LPS(B) to (−). Thus, under normal conditions, when the contacts of both the selector switches SA and SB are closed, both of the detection relays of each pair will become deenergized in response to the operation of either one of the switches LPS(A) or LPS(B). Therefore, the failure of single sensor to operate does not prevent the emergency trip system from operating as intended.

Similarly, the remote contingency detection relays REM(A) and REM(B) (FIG. 6) are deenergized by the closing of either contact 265 or contact 266, which occurs upon the happening of the selected remote contingency such as unit transformer failure for example, in the same manner as previously described in connection with the deenergizing of the detection relays LP.

The thrust bearing of a steam turbine is susceptible to wear in either a direction towards the generator end or in a direction towards the turbine end. In the embodiment illustrated, a sensing device K1 closes its contact 267 upon a predetermined wear of the thrust bearing towards the turbine governor end upon a predetermined wearing of the thrust bearing towards the generator end. Similarly, sensing device K2 closes its contact 268 upon a predetermined wear of the thrust bearing in the direction of either the generator end or the turbine governor end. Such sensing devices are well known in the art and form no part of the present invention. Upon the closing of either the contact 267 of device K1 of the contact 268 of the device K2, both the relays TB(A) and TB(B) are deenergized provided that the selector switch contacts 247 and 248 of the switches SA and SB are closed. The circuitry for shorting out the relay windings of the detector relays TB(A) and TB(B) is identical to the circuitry described in connection with the deenergizing of the detection relays LBO, LP and REM.

According to the present embodiment of the invention a sensing device OST having a normally opened contact 271 is utilized for responding to an overspeed condition of the turbine requiring an emergency trip. The overspeed switch is electrically connected between the contacts 253 of the selector switch SA and the contact 254 of the selector switch SB. The closing of the contact 271, when the contacts 253 and 254 of the selector switches SA and SB are closed, deenergizes the detection relay OS(A) by shorting out its winding through a circuit that extends from (+) and includes the resistor 251, the closed contact 253 of the selector switch SA, and the closed contact 271 of the sensing device OST to (−). The winding of the relay OS(B) is shorted out by a circuit which extends from (+) and includes the resistor 252, the closed contact 254 of the selector switch SB and the closed contact 271 of the sensing device OST to (−). Although, in the present embodiment one electrical and one mechanical overspeed channel is shown, two electrical channels could be utilized connected in the same manner as the previously described sensing devices.

The low vacuum sensing devices LVS(A) and LVS(B) are connected in a slightly different manner than the previously described sensing devices in order to prevent an emergency trip when conditions are not warranted, even though under normal operating conditions, such a low vacuum should result in an emergency trip. In the present embodiment, upon the closing of the low vacuum sensing switch LVS(A), the winding of the detection relay LV(A) is shorted out by a circuit which extends from (+) and includes the resistor 255, closed contact 272 of the switch LVS(A), and back contact 273 of a vacuum trip inhibit relay VTI to (−). Similarly, the detection relay LV(B) is deenergized by a circuit which extends from (+) and includes the resistor 256, closed contacts 257 and 258 of selector switches SB and SA, the closed contact 272 of the relay VTI to (−). Also, the winding of the relays LV(A) and LV(B) are shorted out by the sensing device LVS(B) by a circuit which either extends from (+) and includes the resistor 256, closed contact 274 of the sensing switch LVS(B), and the back contact 273 to (−); or extends from (+) and includes resistor 255, closed contact 258 and 257 of selector switches SA and SB, the closed contact 274 of the sensing switch LVS(B) and the back contact of relay VTI to (−). When it is desired to inhibit the low vacuum trip, such as during startup, for example, the relay VTI is energized by operating a pushbutton 275 on the control panel which energizes latch relay 269 closing its front contact 276. The closing of the front contact 276 energizes the coil or relay VTI by a circuit which extends from (+) and includes resistor 277, winding VTI, front contact 276 of the latch relay 269, normally closed contact 278 of low vacuum switch LVL which opens on increasing pressure of four psia and decreasing pressure of three psia, normally closed contact 281 of low vacuum switch LVH, which opens on increasing pressure of approximately seventeen psia, normally closed contact 282 of a pushbutton 283 on the control panel to (−). Once the relay VTI is energized, it is held energized by a stick circuit which extends from (+) and includes the resistor 277, the winding of relay VTI and its front contact 283. When the relay VII is energized, a lamp 284 on the control panel is energized by a circuit which extends from (+) and includes a 220 kilohm resistor for example, front contact 283, and the closed contacts 278, 281, and 282 to (−). The vacuum trip inhibit relay VTI is deenergized to render the emergency trip system responsive to an insufficient vacuum by the operation of the pushbutton 283 to open its contact 282, the opening of the contact 278 of LVL or the opening of the switch contact 281 of the switch LVL. Therefore, the low vacuum operating contingency is inhibited during start-up, and becomes inhibited when the vacuum first reaches a certain condition.

Referring to FIG. 7, the sensing devices, which are described in connection with a low bearing oil pressure contingency by way of illustration are so arranged that a failure of a single sensing device does not cause an unwarranted emergency trip or a failure of a single sensing device does not prevent an emergency trip. In the embodiment of FIG. 7, pressure switches, LBOS-(A1)(A2)(A3) and (A4), which operate in response to low bearing lubricating oil pressure, each include respective contacts 263(A1)(A2)(A3) and (A4) which are closed under normal operating conditions, and open in response to the operation of its associated pressure switch LBOS. Under normal operating conditions, each one of the switches LBOS maintains an associated relay LBOX energized by a circuit which extends from (+) and includes the respective normally closed contact 263 of its associated switch LBOS to (−). The relays LBOX(A1) and LBOX(A3) each respective front contacts 701 and 703; and the relays LBOX(A2) and LBOX(A4) each have respective front contacts 702 and 704 which maintain; under normal operating condition, the detection relays LBO(A) and LBO(B) energized as described in connection with FIG. 6. Should either one or both of the contacts 701 or 703 become deenergized by reason of the failure of pressure switches LBOS(A1)(A3) or relays LBOX-(A1)(A3), for example, its associated detection relay LBO(A) remains energized by the circuit which extends from (+) and includes the closed contacts 706 and 707 of the switches SA and SB and the closed contacts 702 and 704 of the relays LBOX(A2), (A4) to (−). Similarly, if one or both of the contacts 702 and 704 should fail to open the detection relay LBO(B) remains energized by a similar circuit which includes the closed contacts 701 and 703. Thus, the failure of any one sensing circuit or device during normal operation does not cause an unwarranted trip; and the failure of any one of the sensing devices, which causes contact 701, 703 or 704 to remain closed does not prevent an emergency trip.

The selector switches SA and SB each have two independent electrical stages; one stage includes the contacts described in connection with FIG. 6, and the other stage includes the contacts described in connection with FIG. 8. The switches SA and SB are located on the remote testing and indicator panel to selectively open and close particular contacts of each stage as hereinafter described. For example, in FIG. 6 selector switch SA can be operated to open either its contact 234, 238, 247, 253, 258, or 706; and selector switch SB can be operated to open either its contact 233, 237, 248, 254, 257, or 707. The operation of the selector switch SA, for example, to open its contact 238 changes the energizing circuit for the detection relay LP(A) so that it extends from (+) to include the resistor 235 and the winding of the relay LP(A) to (−). The circuit for maintaining the detection relay LP(B) energized when the contact 238 is open extends from (+) and includes the resistor 236 and the winding of relay LP(B) to (−). Thus, upon the closing of contact 261 of the sensing device LPS(A) only, the winding of the detection relay LP(A) is shorted out causing the relay to drop out. The relay LP(B) remains energized. Similarly, upon the closing of the contact 262 of the sensing device LPS(B) only the detection relay LP(B) is deenergized. The other stage of the selector switch operation is discussed in more detail hereafter in connection with FIG. 8.

Figure 8:
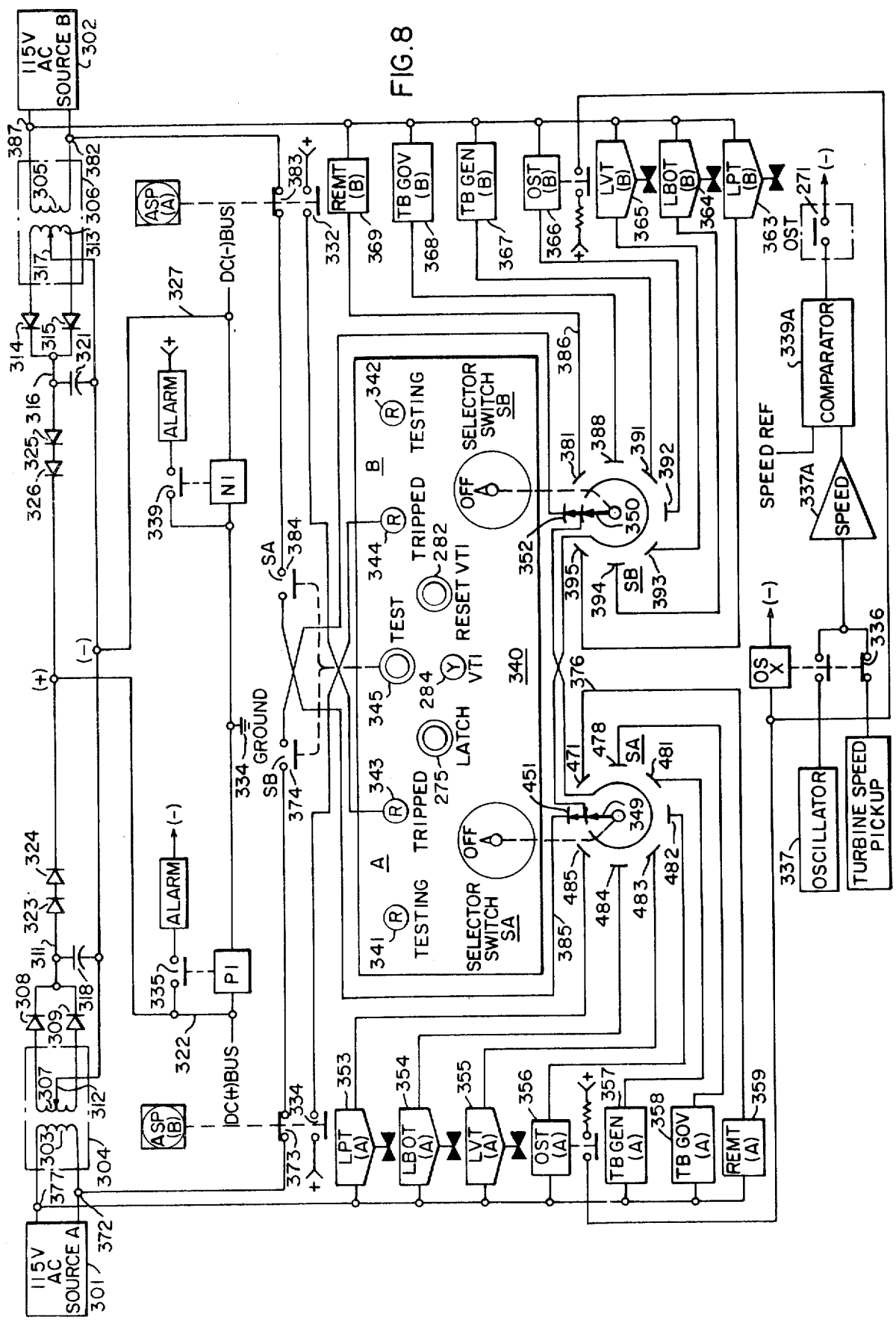
FIG. 8 is a schematic diagram of another portion of the electrical part of the emergency trip system according to one embodiment of the present invention illustrating the circuitry for the alternating current and dc power supply together with ground fault detection system and the arrangement for selectively testing remotely the response of the emergency trip system to individual operating contingencies.

Referring first to the schematic diagram of the power supply arrangement of the system in FIG. 8, two independent alternating current sources are provided for the operation of the electrical portion of the emergency trip system. With reference to the previous description of FIG. 6, the solenoid operated pilot valves AST1 and AST3 and the trip relays A1 and A2 are operated directly from the alternating current source (A) referred to at 301 of FIG. 8. The solenoid operated pilot valves AST2 and AST4 and the trip relays B1 and B2 are operated directly from the 115 volt alternating current source (B) referred to at 302 of FIG. 8.

The alternating current sources (A) and (B) referred to at 301 and 302 in FIG. 8 are used in combination to provide a single direct current source utilized for those components operated by direct current in the emergency trip system. The voltage source (A) is connected to a primary winding 303 of a transformer 304; and the voltage source (B) is connected to a primary winding 305 of a transformer 306. The induced voltage in center tap secondary winding 307 of the transformer 304 is rectified by a pair of diodes 308 and 309 connected across the secondary winding 307 to permit only the positive portions of the AC voltage on line 311. Similarly, the induced voltage in center tap secondary winding 313 of the transformer 306 is rectified by diodes 314 and 315 connected across the secondary winding to produce a positive rectified voltage on line 316. A capacitor 318 smoothes the rectified voltage from the transformer 304 of the voltage source (A); and capacitor 321 smoothes the rectified voltage from the transformer 306 connected to the voltage source (B). The positive conductors 311 for voltage source (A) and 316 for voltage source (B) are commonly connected to a positive DC bus 322. The rectified positive voltage on conductor 311 is connected to the bus 322 through positive going diodes 323 and 324. The rectified positive voltage on conductor 316 is connected to the bus 322 through positive going diodes 325 and 326. The center taps 312 for voltage source (A) and 317 for voltage source (B) are commonly connected to a negative direct current bus 327. Thus, should the voltage source (A) become non-existent, the DC voltage is maintained by the AC voltage source (B). Similarly, if the voltage source (B) should fail, the DC voltage is maintained by the AC voltage source (A).

Contacts 373 and 383 of pressure switches ASP(A) and ASP(B) (See FIG. 2) are provided to check the pressure condition of the pilot pressure of valves AST1 and AST3, and AST2 and AST4, respectively so that a test will not result in an inadvertent trip. Upon the operation of the portion of the trip system controlled by the alternating current source (A), for example, contact 332 of pressure switch ASP(A) is closed to illuminate lamp 343 indicating that a test cannot be conducted without causing an emergency trip. Upon the operation of the portion of the trip system controlled by the voltage source (B), switch ASP(B) closes its contact 334 to illuminate trip indicating lamp 344 indicating that a test cannot be conducted without causing an emergency trip.

Referring again to FIGS. 6 and 8, there are a number of circuit sections of the DC circuit which can be subjected to a ground fault. One is a circuit section which includes the positive DC bus, such as at point G1, for example, which is commonly connected to one side of all the resistors 231, 232, 235, 236, 241, etc., as denoted by the (+) designation; the second circuit section is the negative DC bus such as at point G2, for example, which is commonly connected to one side of the relays REM(A), REM(B), LP(A), LP(B), etc., and one side of the sensor switches 265, 266, 261, 262, etc., as denoted by the (−) designation; and the third circuit section which includes the switches SA and SB (FIGS. 6 and 8) and the common connections to the other side of the resistors 231, 232, etc., relays REM(A), REM(B), etc., and sensor switches 265, 266, etc., such as at point G3, for example. During testing, selected ones of the third circuit section terminate at either the switch SA or SB hereinafter described in connection with the testing operation. The solenoid valves included in the invention, the trip relays 204 and 212, and the latch relay 269 are energized directly from either the AC source (A) or AC source (B) as shown in the drawings.

With respect to the DC circuit the arrangement of the present invention provides for a "floating" DC circuit; that is, neither the positive nor the negative DC bus is grounded. Also, the ohmic value of each of the resistors and the characteristics of the associated relay coil as described above is of such a value that the relays will operate continuously should either the first, second, or third circuit section G1, G2, or G3 be subjected to a ground fault. Also, the arrangement is such that multiple ground faults can occur in the third circuit sections without affecting the operation of the system. A ground fault in both the first and second or second and third sections would, of course, affect the operation of the system.

Connected across the positive DC bus 322 and the negative DC bus 327 are series connected relay coils P1, and N1. The commonly connected terminal between relay windings or coils P1 and N1 are connected to ground 334. Thus, the relay P1 is connected to the ground 334 from the positive DC bus and the relay N1 is connected to the ground 334 from the negative DC bus. Each of these relay coils should be able to be operated continuously at twice the voltage to which they are subjected under normal conditions. In the present embodiment of the invention where the normal applied voltage is 60 volts (from (+) or (−) to ground) it is contemplated to use standard DC relays which can operate between approximately nine volts and one hundred forty eight volts, for example.

When no ground fault is present, the relays P1, and N1, are normally energized. The relay P1 is energized from the bus 322 to the ground 334 by approximately +60VDC; and the relay N1 is energized from the bus 327 to the ground 334 by approximately −60VDC.

Upon the occurrence of a ground fault on the positive DC bus or first circuit section, as previously described, the relay P1 shorts out closing back contact 335 to sound an appropriate alarm. Upon the occurrence of a ground fault on the negative DC bus or second circuit section as previously described, the relay N1 shorts out closing back contact 339 to sound another appropriate alarm. In the foregoing instances, the ground fault is monitored continuously, and an alarm sounds, even though such ground faults do not affect the status or operation of the system arranged according to the present invention.

Should any of the circuit sections G3 be inadvertently grounded, the relays P1, and N1, remain energized during normal operation of the system in the embodiment where the contacts of the pressure switches are normally open because of the resistors, such as 231 and 232, between the fault and the positive bus, and the relay windings such as REM(A) and REM(B) between the fault and the negative bus of the closed circuit. However, during testing of the system, and in the open pressure switch embodiment not only is such a ground fault alarmed, but it is also located with respect to the particular operational contingency circuit in which it occurs.

For example, referring to FIG. 6, assume that a ground fault exists at a point G4 in the third circuit section that includes the contingency detection relays TB(A) and TB(B). For testing of the portion of the trip circuit that includes TB(A), the contact 247 on the switch SA is opened. Then, as hereinafter described in connection with testing, the sensing switch K1 closes its contact 267, thereby connecting the second circuit section to the portion of the third circuit section under test, which causes the relay N1 to short out to provide the appropriate alarm. Upon the completion of the test, the contact 267 opens removing the alarm or ground fault indication. When the contingency that includes relay TB(B) is under test, the contact 248 of the switch SB is opened, which of course, removes a fault occurring at G4 from the circuit.

Referring further to FIG. 8, a control and indication panel 340, which may be located in the control room of the power plant, for example, is provided for indicating specific conditions of the emergency trip system and to control the testing of the system. In the present embodiment of the invention, the panel 340 is provided with lamps 341 and 342, which are illuminated during the testing of a particular portion of the system. The lamp 341 is illuminated during a test of that portion of the components which includes the sensing devices and contingency detection relays of FIG. 6 which bear the suffix (A) and trip solenoid valves AST1 and AST3. The lamp 342 is illuminated during the testing of that portion of the system which includes the sensing devices and contingency detection relays bearing the suffix (B) and trip solenoid valves AST2 and AST4. Upon the completion of the testing of a given function in the (A) portion of the system, lamp 343 is illuminated. Upon completion of the testing of a function in that portion of the system that includes components (B), lamp 344 is illuminated. When the previously described vacuum trip inhibit relay VT1 is energized, such as during starting, for example, the lamp 284 is illuminated. After the system has been tripped, or when a portion of the system has been subjected to a completed test, the system is reset by the operation of the latch pushbutton 275 (see FIG. 6) to energize the latch relay and the particular trip relay A1 and A2, and B1 and B2 as the case may be. In turn, the solenoid pilot valves AST1 and AST3, and AST2 and AST4 are energized as the case may be. The latch pushbutton 275 is also operated to operate the vacuum trip inhibit feature as previously described. The reset pushbutton 282 for the vacuum trip inhibit is operated to render it inoperative. The operative condition of the vacuum trip inhibit is indicated to the operator by the lamp 284.

To initiate a test, test pushbutton 345 is operated after the particular operating contingency and its associated sensing devices and components has been selected by the appropriate selector switch SA or SB. The selector switches may be of any well known type of rotary or other type of selector switch having a plurality of contacts which are open and closed at certain manual settings. In addition to the function of the selector switches SA and SB described in connection with the description of the circuitry of FIG. 6, the selector switches also have other contacts which are selectively closed when normally operated to energize portions of the system which initiate the effect of simulating the malfunction or contingency which causes the turbine to trip.

In FIG. 8, which shows the second electrical stage of the test selector switches SA and SB are illustrated shown in their "off" position. In this position switch SA, a member 349 closes "off" contact 451 for switch SA, and member 350 closes "off" contact 352 for switch SB. In this position, the contingency simulation test components referred to by reference numerals 353 through 359 and bearing the legend suffix (A), and those referred to by reference numerals 363 through 369 and bearing the legend suffix (B) are all in a deenergized position. In this condition, the contacts, 243, 238, 247, 253, 258 and 706 (FIG. 6) of the selector switch SA; and the contacts 233, 237, 248, 254, 257 and 707 (also FIG. 6) are all in a closed condition so that the system can operate to trip the turbine upon the operation of the sensing devices as previously described in connection with FIGS. 6 and 7.

The specific arrangement of each portion of the system for operating the contingency sensing devices in response to the energization of its associated simulation device 353 through 359 inclusive or 363 through 369 inclusive is described in connection with the description of system 18 of FIG. 2, and the description of FIG. 9 and FIG. 10 hereinafter. For an understanding of the circuitry of FIG. 8, with respect to the testing of the system by the operation of selector switches SA and SB it is pointed out that in the illustrated embodiment for those operating contingencies having two sensing devices there is a contingency simulation arrangement for causing the operation of each respective sensing device, and for those operating contingencies having four sensing devices, for example there is a contingency simulation arrangement for each pair of sensing devices, as described hereinafter. For the overspeed operating contingencies having only one electrical sensing device, there is an associated simulation testing device for each of the contingency detection relays OS(A) and OS(B). Also, in accordance with the present embodiment of the invention during a test operation, only one contingency detection relay of each pair of deenergized. The other contingency detection relay of the pair remains responsive to the sensing device associated therewith to trip the turbine during a test should a trip contingency occur.

The selector switches SA and SB are of the type that are so interlocked that a test simulation device 353 through 359 inclusive bearing the suffix legend (A) cannot be energized if any one of the contingency simulation devices 363 through 369 inclusive and bearing the legend suffix (B) are energized, and vice versa. This is to prevent the operator from inadvertently operating simultaneously the selector switches SA and SB resulting in an unnecessary turbine trip. Specifically, when the contact 471 of switch SA is closed, the simulation testing device REMT(A) referred to at 359 is energized from the alternating current source (A) by a circuit which extends from terminal 372 of the AC source, front contact 373 of the trip switch ASP(B), closed contact 374 of the "test" pushbutton 345, "off" contact 352 of switch SB, closed contact 471 of the switch SA, wire 376, the winding of relay 359, and terminal 373 of the voltage source (A). It should be noted in the present embodiment of the invention, that when the member 349 is in contact with 471 of the switch SA, the contact 234 (FIG. 6) of the switch SA is open. When the member 349 is in electrical contact with 478, relay 358 is energized by a similar circuit. Also, stationary contacts 481, 482, 483, 484 and 485 are provided for energizing devices 357 through 353, respectively. The operation of the selection switch SB to a position such that member 350 is in contact with contact 381, the remote simulation testing device REMT(B) referred to at 369 is energized by a circuit which extends from terminal 382 of the voltage source (B) and extends through front contact 383 of the pressure switch ASP(A), closed contact 384 of the "test" pushbutton 345, wire 385, "off" contact 451 of the switch SA, the wire 379, the contact 381 of switch SB, wire 386, and winding 369 of the device REMT(B) to terminal 387 of the voltage source (B). The energizing of the remaining contingency simulation devices 368 through 363 is accomplished by a similar circuit which includes the movable contact member 350 being in electrical engagement with contacts 388, 391, 392, 393, 394 or 395, respectively of the selector switch SB.

From the foregoing, it should be noted that none of the simulation devices bearing the legend suffix (A) can be energized from the alternating voltage source (A) if the portion of the trip system energized by power from source (B) is operated. Also, none of the contingency simulation devices bearing the legend suffix (B) are able to be energized from the AC voltage source (B) if the portion of the trip system energized from source (A) is operated. Thus, the possibility of an unnecessary trip is eliminated when one of the AC power sources or other component has failed, and the operator attempts to test the other portion of the system depending on AC power from source (B) or vice versa.

For each operating contingency or malfunction that should result in a turbine trip, there is a pair of contingency simulation devices for testing the system. For example, associated with the low hydraulic pressure contingency are normally closed solenoid valves LPT(A) and LPT(B) bearing reference numeral 353 and 363, respectively. For an emergency trip contingency caused by low bearing lubricating oil pressure, there are simulation devices that include solenoid valves LBOT(A) and LBOT(B) bearing reference numeral 354 and 364, respectively. For the condenser low vacuum contingency, there are provided simulation devices LVT(A) and LVT(B) bearing reference numeral 355 and 365, respectively. For an overspeed operating contingency, there are contingency simulation devices OST(A) and OST(B) bearing reference numeral 356 and 366, respectively. For the operating contingency involving thrust bearing wear in the direction of the generator, there are provided simulation devices TB(GEN)(A) and TB(GEN)(B) bearing reference numeral 357 and 367, respectively. For the contingency simulation corresponding to thrust bearing wear in the direction of the governor pedestal of the turbine, there is provided a contingency simulation device TB(GOV)(A) and TB(GOV)(B) bearing reference numeral 358 and 368, respectively. Finally, for a selected remote contingency, there are provided simulation devices REMT(A) and REMT(B) bearing the reference numeral 359 and 369, respectively.

Referring to FIG. 9, the system for sensing and simulating low bearing lubricating oil pressure of the turbine power plant is referred to generally at 13. The bearing oilpressure line referred to at 401 is in communication through a normally open maintenance valve 402 with a pipeline 403. The bearing oil is conducted from the pipeline 403 through a restrictive orifice 405 and 406 in parallel to be in communication with pressure sensitive devices LBOS(A1) and (A2), and LBOS(A3) and (A4). Upon a decrease in the bearing oil pressure in line 403, all four pressure sensors LBOS are influenced; and when such pressure decreases to a value wherein LBOS(A1) and (A3) and/or LBOS(A2) and (A4) are operated, the turbine trips as previously described. Pressure gauges 407 register the pressure to which the sensing devices LBOS(A1) and (A3) are subjeted, and gauge 408 registers the bearing oil pressure to which LBOS(A2) and (A4) are subjected. The bearing oil pressure in communication with LBOS(A1) and (A3) can be released by energizing the normally closed solenoid valve LBOT(A)(354) and releasing the oil to a drain 411. The oil pressure in communication with the sensing device LBOS(A2) and (A4) is released by opening the normally closed solenoid valve LBOT(B)(364) and conducting the oil to drain 411. The restrictive orifices 405 and 406 are of such a size that the bearing oil pressure in the line 403 will decrease insignificantly when the pressure is released between such restrictive orifice and the drain 411. The normally closed locally operated valves 412 and 413 can be used to gradually release the oil pressure to which its respective sensing device is subjected to determine the exact pressure at which such devices will operate. Thus, under normal contingency should the bearing oil pressure become dangerously low, the contingency responsive devices LBOS(A1), (A2), (A3), and (A4) will operate to trip the turbine.

To test the low bearing oil trip function the simulating device LBOT(A) is energized to open the solenoid valve 354 which serves to release the pressure without restriction from the sensing devices LBOS(A1) and (A3) without affecting the sensing devices LBOS(A2) and (A4) or the pressure in the line 403. Similarly, the solenoid valve simulation sensing device LBOT(B) can be energized to test the response of the trip system to the sensing devices LBOS(A2) and (A4). Should two of the sensing devices LBOS(A1) and (A3), or LBOS-(A2) and (A4) be under test, one of the other pair of sensing devices is still capable of responding to an actual decrease in the pressure line 403 to trip the turbine.

Referring to FIG. 10, the low vacuum contingency detection portion of the trip system is referred at 16. Pipeline 421 is in communication through maintenance valve 422 with the vacuum in the condenser 28. The pipeline 421 is in communication with the contingency sensing devices LVS(A) and LVS(B) through orifices 423 and 424 which operate to trip the system when the vacuum is insufficient. The pressure switch LVS(A) operates on increasing condenser pressure at approximately 4 psia. The pressure switch LVS(B) has two stages. Stage one operates on increasing condenser pressure at approximately 4 psia and the second stage operates on decreasing condenser pressure at approximately 3 psia. The sensing device LVH which is in communication with the condenser vacuum through orifice 425 and the pipeline 421 operates on increasing pressure at approxiamtely 17 psia. The gauges 426 and 427 indicate the vacuum to which the sensing devices LVS(A) and LVS(B) respectively, are subjected. Upon the operation of the contingency simulation device LVT(A) referred to at 355, a vent 428 is open which operates the sensing device LVS(A). Upon the energizing of the contingency simulating device LVT(B) referred to at 365, the vent 428 is opened to operate the sensing device LVS(B). The high pressure sensing device LVH which operates on increasing pressure at approximately 17 psia, requires the introduction of air in order to test the switch above atmospheric pressure. Thus, a valve 431 can be opened manually to introduce air pressure above atmospheric in communication with the sensing device LVH to test its operation. In the illustrated embodiment, the valve 431 is shown as a locally operated valve without remote testing capability because such a sensing device is utilized only in the vacuum trip inhibit circuit previously described. However, such sensing device can be included for remote testing if required. Locally operated valves 432 and 433 are utilized to calibrate the pressure switches LVS(A) and LVS(B), respectively.

Referring to FIG. 2, the low hydraulic pressure sensing and simulation arrangement is referred to at 18. This hydraulic arrangement is similar to the hydraulic arrangement described in connection with the low bearing oil pressure of FIG. 9. The sensing devices LPS(A) and LPS(B) are operated in response to a predetermined reduction in the high pressure hydraulic fluid for maintaining the steam inlet valves in an operative condition. Energizing the simulation devices for solenoid valves LPT(A) and LFT(B) release the pressure to which the sensing devices LPS(A) and LPS(B), respectively are subjected. Pressure gauges 460 and 461 indicate the pressure in communication with the sensing devices. Valves 462 and 463 may be used to determine the exact point at which the sensing devices close or open their respective contacts. The restrictive orifices 464 and 465 prevent a significant decrease of the high pressure hydraulic supply pressure in line 51 during testing.

When it is desired to test the overspeed contingency, the selector switch SA or SB (FIG. 8) is operated to the required position which energizes relay OST(A) or OST(B) as the case may be. In response to the picking up of either relay OST(A) or OST(B) relay OS(X) is energized which opens its back contact to disconnect the actual turbine speed pickup and closes its front contact 366 transferring the simulated turbine speed measurement from oscillating device 337. This device 337 is constructed to simulate an overspeed condition which is applied to an operational amplifier 337A and compared with a trip turbine speed reference by comparator 339A to close the switch 271. The remainder of the operation is similar to the testing of the previously described contingencies.

The thrust bearing wear contingency is accomplished by physically moving a conventional wear-sensing device (not shown) in response to either the energization of relay 358 or 367 depending on the portion of the system under test; and the remainder of the system operates as previously described. The arrangement of the thrust bearing wear sensor does not form part of the present invention.

DESCRIPTION OF OPERATION When the system is not being tested and the turbine is operating, the selector switches SA and SB are in their "off" position (see FIGS. 6 and 8); and the indicating lamps indicating "testing" and "tripped" are not illuminated. Assuming the turbine power plant is subjected to low bearing oil pressure for example, the sensing devices LBOS(A1), (A2), (A3) and (A4), open their respective contacts 263A1 and 263A2, 263A3, 263A4. (FIG. 7) In response to the opening of these contacts, respective relays LBOX are deenergized, which deenergizes the detection relays LBO(A) and LBO(B) as previously described. This results in the opening of the contacts 217 and 226 upon the relays LBO(A) and LBO(B), respectively. Upon the opening of the contacts 217 and 226, the alternating current voltage circuit for the normally energized trip relays A1 and A2 is opened; and the energizing circuit for the trip relays B1 and B2 is opened. In response to the deenergizing of the trip relays, the front contacts 203, and 204 of the trip relays A1, A2, and the front contacts 210 and 212 of the trip relays B1, B2 open, which deenergize the pilot operated solenoid valves AST1, AST3, AST2, and AST4. In response to the deenergizing of the solenoids of the valves AST, the pilot fluid pressure is conducted to the drain 42 causing the main portions 65, 66, 67 and 68 of the pilot operated valves AST1 through AST, respectively, to open. The opening of the main portions of these valves in turn drains the pressure for rendering the steam inlet valves operative to the drain 42 through paths which can include either the open valves AST1 and AST2 or AST1 and AST4; or AST3 and AST4, or AST3 and AST2. The decrease of the hydraulic pressure in the line 76 results in immediate decrease in the trip pressure to which the steam inlet valves are subjected by permitting the oil to flow through the respective check valves 71, 73 and 81, 74 of the governor valves GV1–GV8 and interceptor valving IV; and to drain through the respective check valves 82 and 83 of the throttle valves TV1-TV4, and the solenoid valving SV. This causes the steam inlet valves to rapidly close thereby shutting off all steam to the turbine.

Once the low bearing oil pressure has increased to a value permitting the contacts of the sensing devices LBOS(A1), (A2), (A3) and (A4) to close, the respective relays LBOX(A1), (A2), (A3), and (A4) pick up, closing their respective front contacts 701, 702, 703, and 704. This in turn energizes the detection relays LBO(A) and LBO(B) to close their contacts 217 and 226. However, the trip relays A1, A2 and B1, B2 will not reenergize until the pushbutton 275 of the latch relay is operated because of the front contacts 22, 22A and 229, 229A in the energizing circuit of the trip relays. The closing of front contact 470 of the latch relay causes the trip relays A1, A2 to be energized if the bearing oil pressure is of the proper value. Similarly, the closing of front contact 471 of the latch relay permits the trip relays B1, B2 to be reenergized. The energizing of the trip relays in turn reenergize the pilot operated solenoid valves AST1 through AST4 which permits the pilot pressure (see FIG. 2) to build up in lines 87 and 95, which in turn close the main portion 65 through 68 of the pilot operated valves AST1-AST4. This in turn permits the high pressure hydraulic fluid to increase again rendering the steam inlet valves operated to an open condition under control of the turbine control system.

Should one of the sensing devices LBOS fail to operate upon predetermined decrease in bearing oil pressure, both of the detection relays LBO(A) and LBO(B) are still deenergized to deenergize both of the trip relays 204 and 212 as described in connection with FIG. 6 to deenergize the valves AST1 through AST4.

In addition to providing a high degree of safety in tripping the turbine upon the occurrence of a predetermined malfunction or operating continency, contingency, is also important that the emergency trip system is not inadvertently tripped upon the failure of components or portions of the system; and in the event of a component failure that the system is still in a condition to trip the turbine should a predetermined contingency occur. For example, if one of the independent alternating current voltage sources (A) or (B) become nonexistent, the direct current source is still intact to maintain the contingency detection relays (see FIG. 6) energized and responsive to their associated sensing devices. However the failure of the voltage source (A) for example, would result in the deenergizing of trip relays A1, A2 resulting in the opening of the pilot valves AST1 and AST3. The opening of these pilot valves does not cause the trip pressure to which the steam inlet valves are subjected, to decrease, because the hydraulic fluid is still blocked from draining by the valves AST2 and AST4. Should a predetermined trip contingency occur, however, the remaining sensing devices could deenergize its respective detection relay to effect the opening of the pilot valves AST2 and AST4 to shut off the steam to the turbine. With respect to the sensing switches LBOS in the embodiment of FIG. 7, an inadvertent opening of one of the switches LBOS does not result in a turbine trip; nor does an inadvertent opening of both switches LBOS(A1) and (A3) or (A2) and (A4) cause a turbine trip.

TESTING OPERATION

In testing the system, first, either the selector switch SA or SB is moved to the position corresponding to the contingency to be tested. For example, assume that the response of the system to low bearing oil pressure is to be tested, the operation of the system and the switch SA, for example, is operated so that its contact 484 is closed (see FIG. 8). Then, the test pushbutton 345 is operated to close its contact 374. Upon the operation of the test pushbutton, the solenoid valve LBOT(A) referred to at 354 is opened, provided that the other portion of the system associated with the switch SB is not tripped. In response to the opening of solenoid valve LBOT(A) (see FIG. 9) the lubricating oil pressure is released in that portion of the line in communication with the pressure switches LBOS(A1) and LBOS(A3). This does not affect the normal bearing oil pressure in the line 403 because of the restrictive orifice 405. When the bearing oil pressure in communication with the sensing devices LBOS(A1), (A3) reaches a predetermined low value, their contacts 263A1 and A3 (see FIG. 7) open to deenergize its associated relay LBOX(A1) and LBOX(A3) which in turn, through the opening of contacts 701 and 703 deenergizes its associated detection relay LBO(A) as described in connection with FIG. 7. The position of the switch SA to the test position opens contact 706 and prevents the detection relay LBO(B) from becoming deenergized to trip the turbine. The opening of the selector switch contacts in the stage of FIG. 6 upon the selection of particular contingencies for test changes the normal energizing circuit for the respective detection relays as previously discussed. For example, when testing the low hydraulic pressure of the A portion of the system, the contact 238 of switch SA is opened which prevents the detection relay LP(B) from becoming deenergized in response to the operation of the sensing device LPS(A). However, this testing does not render the detection relay LP(B) unresponsive to the closing of the contact 262 of the sensing device LPS(B) because the operation of the test switch divides the detection relays LP(A) and LP(B) into two independent circuits. Similarly, the testing of the portion of the system under control of the selector switch SB divides the trip circuit for each of the contingencies selectively in the same manner as the test selector switch SA.

The trip relays A1 and A2 are deenergized which open the circuit to deenergize the solenoids 106 and 209 of the pilot valve portions of the valves AST1 and AST3 as previously described. The deenergizing of the solenoids release the pressure in the pilot pressure line 87, which causes the sensing switch ASP(A) to be operated to energize a circuit to illuminate the lamp bearing a legend "tripped" on the indication panel. The orifice 85 (FIG. 2) prevents the pressure in the line 84 from dropping significantly from its normal hydraulic pressure which in turn prevents the pressure in line 51 from decreasing below a predetermined value sufficient to otherwise cause the rapid closing of the steam inlet valves. In response to the opening of the pilot valve portions 101 and 103 of the valves AST1 and AST3, pressure is released in line 87 to permit the opening of the main portions 65 nad 67. The pressure in line 76 is prevented from decreasing however by the closed condition of the valves AST2 and AST4.

Once the test for the low bearing oil pressure, in the example described is completed, the "test" pushbutton is released by the operator. Upon release of the "test" pushbutton, the solenoid valve LBOT(A) is deenergized to close. Upon the closing of valve LBOT(A), pressure builds up in the line (see FIG. 9) in communication with the pressure switch LBOS(A1) and LBOS-(A3) to close their respective contacts 263(A1) and 263(A3), this closes the energizing circuit LBOX(A1) and (A3), which in turn energizes the detection relay LBO(A). Then the latch button 275 is operated which energizes the trip relays A1 and A2 and in turn the solenoid valves AST1 and AST3, as previously described, to put the system in a normal condition when the pressure in the pilot lines 86 and 87 (FIG. 2) reaches a normal value caused by the closing of pilot portions 101 and 106, the lamp 343 marked "tripped" goes out, the main portions of the valves AST1 and AST3 close and the system is ready for the testing of another contingency; or the testing of the other sensing device or devices and the system response thereto for the same contingency.

From the foregoing description of the operation of the system, together with the drawings, the testing and operation of the system for the other contingencies will become apparent.

In brief summary, an improved electrohydraulic emergency trip system for a steam turbine power plant is provided that utilizes two independent AC power sources, and a DC power source converted from both AC sources by an arrangment that requires both AC sources to fail in order for the system to cause an unnecessary turbine trip. Also, the system is operative in respond to a valid turbine even though one of the AC power sources is nonexistent. Further, the contingency sensing devices are provided and so arranged that failure of a single sensing device will not prevent a turbine trip, and in the preferred a single failure will not cause an unwarranted turbine trip.

Also, a single failure in the hydraulic portion of the system will not cause or prevent a turbine trip.

The emergency trip system of the type described, thus includes provision for remote testing of the operation of each sensing device individually and the response of the system to its operation by simulating the actual conditions which would cause the system to trip the turbine. This testing is accomplished without tripping the turbine; and during such tests, the system is operative to trip the turbine even though the contingency causing the valid trip is the identical contingency under test.

Further, the improved electrohydraulic system is particularly adaptable to automatic testing by computer for example wherein the computer can monitor both the switches ASP(A) and ASP(B) (see FIG. 2), to insure that both the pilot lines to valves AST1 and AST3 and valves AST2 and AST4 are pressurized. A signal can then be given to place the trip system in test mode. The computer can then by a signal select each of the contingencies to be tested in energizing each of the simulation devices (see FIG. 8) in sequence. When the pressure switch ASP(A) senses low pressure, a signal can be given to the computer which informs the computer that such test is successful. A signal can then be given to remove the effectiveness of the simulation device, such as closing the solenoid valve simulation device to permit a contingency to be removed, such as low oil pressure for example, and a signal can be given to either close the valves AST1 and AST3 or to operate the latch. Once the pressure has built up in the pilot line for the valves AST1 and AST3, the pressure switch can give a signal to the computer that the system is ready for the next selection. Such a remote testing operation in no way will prevent the system from responding to a real contingency to cause a valid trip.

While preferred embodiments of the invention have been described in detail, many changes and modifications within the spirit of the invention would occur to those skilled in the art. For example, the sensing circuitry described in connection with FIG. 7 for the low bearing oil pressure contingency can be used for other contingencies of the system, such as low hydraulic, or low vacuum, for example. All such modifications are considered to fall within the scope of the following claims.

I claim:

1. An electrohydraulic emergency trip system for a turbine power plant to close rapidly the steam inlet valves to the turbine in response to a predetermined contingency, comprising:

a plurality of steam inlet valves, an operating mechanism for each steam inlet valve operative to close its associated valve in response to a predtermined decrease of fluid pressure in communication with such operating mechanism, an hydraulic trip system in communication with the valve operating mechanism, a first and a second electrically operable trip valve means operatively connected in the hydraulic trip system to decrease the fluid pressure in response to the operation of both the first and second trip valve means, a first and second electrically operable contingency detection means, first and second independent voltage sources, first circuit means connected to both the first and second voltage sources to generate a third voltage output in response to the generated voltage from either one or both of the first and second voltage sources, second circuit means including the first and second contingency detection means and the third voltage output to operate both the first and second contingency detection means in response to the opening and closing of the second circuit means, third circuit means including the first contingency detection means and the first voltage source to operate the first trip valve means in response to the operation of the first contingency detection means, fourth circuit means including the second contingency detection means and the second voltage source to operate the second trip valve means in response to the operation of the second contingency detection means, said third and fourth circuit means each being effective to operate their respective first and second trip valve means to an open position in response to a loss of the respectively connected first and second independent voltage sources, and means to operate the third circuit means in response to a predetermined contingency.

2. A system according to claim 1 wherein the first and second voltage sources each generate an alternating voltage.

3. A system according to claim 1 wherein the first circuit means generates a direct current output voltage.

4. A system according to claim 3 wherein the second circuit means is a direct current circuit having an ungrounded positive and an ungrounded negative bus, and further comprises a first relay winding electrically connected between the positive bus and ground, a second relay winding electrically connected between the negative bus and ground, each said relay being energized normally between its respectively connected bus and ground at times only when its respectively connected bus is ungrounded, and means responsive to the deenergization of one of the first and second relay windings to indicate a grounding of its respectively connected bus.

5. A system according to claim 4 wherein the second circuit means includes a resistor connected at one end to the positive bus for each contingency detecting means, each contingency detecting means includes a winding connected between the other end of the resistor and the negative bus, and a normally open switching means electrically connected at the other end of the resistor and the negative bus, whereby a ground fault occurring in the second circuit means between the resistor and the winding deenergizes the second relay winding upon the closure of the sensing means.

6. An electrohydraulic emergency trip system for a turbine power plant that includes an hydraulic system with at least two electrically operable valve means connected to close the steam inlet valves to the turbine in response to a predetermined contingency, comprising, an independnet voltage source connected to operate each of the electrically operable valve means, circuit means connected to at least two of the independent voltage sources operatively energized in response to the presence of a voltage from any one of the connected voltage sources, and electrically operable contingency detection means govern by the voltage in said circuit means to govern each independent voltage source to operate said electrically operable valve means in response to a predetermined contingency.

7. A system according to claim 6 wherein the electrically operable valve means are normally energized by the respective independent voltage sources, the contingency detection means are normally energized by said circuit means, and the contingency detection means is deenergized in response to the predetermined contingency to deenergize the electrically operable valve means.

8. A system according to claim 6 wherein said circuit means is ungrounded and the contingency detection means is governed by the presence of a voltage across buses of opposite polarity, further comprising, a first resistance means connected between one of the buses and ground operative in response to the grounding of said one bus, a second resistance means connected between the other of the buses and ground operative in response to the grounding of the other bus, and means responsive to the operation of one of the resistance means to indicate a ground fault.

9. A system according to claim 8 wherein said circuit means is energized by a DC voltage.

10. A system according to claim 8, further comprising normally open contact sensing means connected between one bus of the circuit means and each contingency detection means, whereby one of said resistance means is operated upon the closing of the contact sensing means.

* * * * *